(12) United States Patent
Tsushima

(10) Patent No.: US 8,605,816 B2
(45) Date of Patent: Dec. 10, 2013

(54) NON-CONTACT WIRELESS COMMUNICATION APPARATUS, METHOD OF WAVEFORM-SHAPING ENVELOPE CURVE, AND MOBILE ELECTRONIC DEVICE

(75) Inventor: Takaaki Tsushima, Chiba (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 322 days.

(21) Appl. No.: 13/041,146

(22) Filed: Mar. 4, 2011

(65) Prior Publication Data

US 2011/0293039 A1   Dec. 1, 2011

Related U.S. Application Data

(60) Provisional application No. 61/349,034, filed on May 27, 2010.

(51) Int. Cl.
*H04K 1/02* (2006.01)
(52) U.S. Cl.
USPC ...... 375/296; 340/10.51; 340/10.1; 340/10.4; 235/451; 375/295

(58) Field of Classification Search
USPC ............... 340/10.1, 10.51; 235/451; 375/296; 455/116, 205, 208, 272
See application file for complete search history.

(56) References Cited

U.S. PATENT DOCUMENTS

| | | | |
|---|---|---|---|
| 6,232,906 B1 * | 5/2001 | Tada | 341/155 |
| 2006/0289649 A1 * | 12/2006 | Sugiura et al. | 235/451 |
| 2009/0160625 A1 * | 6/2009 | Miyagawa | 340/10.51 |

FOREIGN PATENT DOCUMENTS

| | | |
|---|---|---|
| JP | 2004-153463 A | 5/2004 |
| JP | 2006-31508 A | 2/2006 |

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

A non-contact wireless communication apparatus that includes: an antenna section configured to receive a carrier wave; an envelope-curve shaping section configured to shape a falling waveform of an envelope curve of the carrier wave into a gradual falling waveform; and a demodulation section configured to extract the envelope curve shaped by the envelope-curve shaping section and perform envelope-curve detection by binarizing the envelope curve with a predetermined threshold value.

12 Claims, 12 Drawing Sheets

NON-CONTACT WIRELESS COMMUNICATION APPARATUS, METHOD OF WAVEFORM-SHAPING ENVELOPE CURVE, AND MOBILE ELECTRONIC DEVICE

CROSS REFERENCE TO RELATED APPLICATIONS

This application is related to and claims priority under 35 U.S.C. §119(e) to Provisional Application Ser. No. 61/349,034, filed May 27, 2010, the contents of which are hereby incorporated herein by reference.

BACKGROUND

1. Field

The present specification relates to a non-contact wireless communication apparatus, method of waveform-shaping an envelope curve, and mobile electronic device having improved reception precision of transmission data (received data from the reader/writer apparatus) transmitted from the reader/writer apparatus when wireless communication with a reader/writer apparatus is performed on the basis of an ASK-modulation method (ASK: Amplitude Shift Keying).

2. Description of the Related Art

In these days, there is widespread knowledge of mobile devices including a non-contact wireless communication apparatus performing radio communication with a reader/writer apparatus on the basis of an ASK modulation method (ASK: Amplitude shift keying).

The applicant of the present application has conducted a technical survey on techniques for improving communication precision with a reader/writer apparatus as related arts relating to the present application. As a result, Japanese Unexamined Patent Application Publication Nos. 2006-31508 and 2004-153463 have disclosed such techniques individually.

Here, mobile devices of nowadays include electronic circuit boards and a battery having a metal case, and are formed using a lot of metals. For example, metal parts are frequently used for cases of mobile devices, etc. When radio communication is performed between such a mobile device and a reader/writer apparatus, a reception error sometimes occurs by the influence of metals at the time of receiving data from the reader/writer apparatus.

BRIEF SUMMARY

The present specification has been made in view of the above-described problems. According to an embodiment, there is provided a non-contact wireless communication apparatus including: an antenna section configured to receive a carrier wave; an envelope-curve shaping section configured to shape a falling waveform of an envelope curve of the carrier wave into a gradual falling waveform; and a demodulation section configured to extract the envelope curve shaped by the envelope-curve shaping section and perform envelope-curve detection by binarizing the envelope curve with a predetermined threshold value.

According to another embodiment, there is provided a communication method, implemented on a non-contact wireless communication apparatus, including: receiving, at an antenna section, a carrier wave; shaping a falling waveform of an envelope curve of the carrier wave into a gradual falling waveform; and extracting the shaped envelope curve performing envelope-curve detection by binarizing the envelope curve with a predetermined threshold value.

According to another embodiment, there is provided a mobile terminal apparatus including: a communication circuit configured to perform radio communication with a base station; and a non-contact wireless communication device that includes an antenna section configured to receive a carrier wave; an envelope-curve shaping section configured to shape a falling waveform of an envelope curve of the carrier wave into a gradual falling waveform; and a demodulation section configured to extract the envelope curve shaped by the envelope-curve shaping section and perform envelope-curve detection by binarizing the envelope curve with a predetermined threshold value.

In the present embodiments, a falling waveform of an envelope curve of a carrier wave is shaped into a gradual falling waveform so that the envelope-curve waveform of the carrier wave is shaped into a waveform close to a triangular waveform. Accordingly, in the demodulation section detecting an envelope curve, it becomes easy to perform binarization of the carrier wave, which is carried out on the basis of a predetermined threshold value.

Also, according to another embodiment of the present invention, there is provided a connection control section controlling the envelope-curve shaping section so as to shape the envelope curve of the carrier wave only at data receiving time. In such an embodiment, the connection control section controls the envelope-curve shaping section so as not to perform shaping of the envelope curve of the carrier wave at data transmission time. Thus, the connection control section controls the envelope-curve shaping section so as to perform shaping of the envelope curve of the carrier wave only at data receiving time. Thereby, the disadvantage of shortening a communication distance at data transmission time is prevented.

In this regard, the present specification can be applied to a mobile electronic device, such as a mobile telephone including a non-contact wireless communication apparatus in addition to a card-type non-contact wireless communication apparatus.

Also, a word "non-contact wireless communication" means a word including near-field radio communication in addition to radio communication in the immediate close vicinity.

By the present embodiments, it is possible to improve reception precision of data received from a reader/writer apparatus even in the case of being heavily influenced by metal parts.

DETAILED DESCRIPTION

Figure 1:
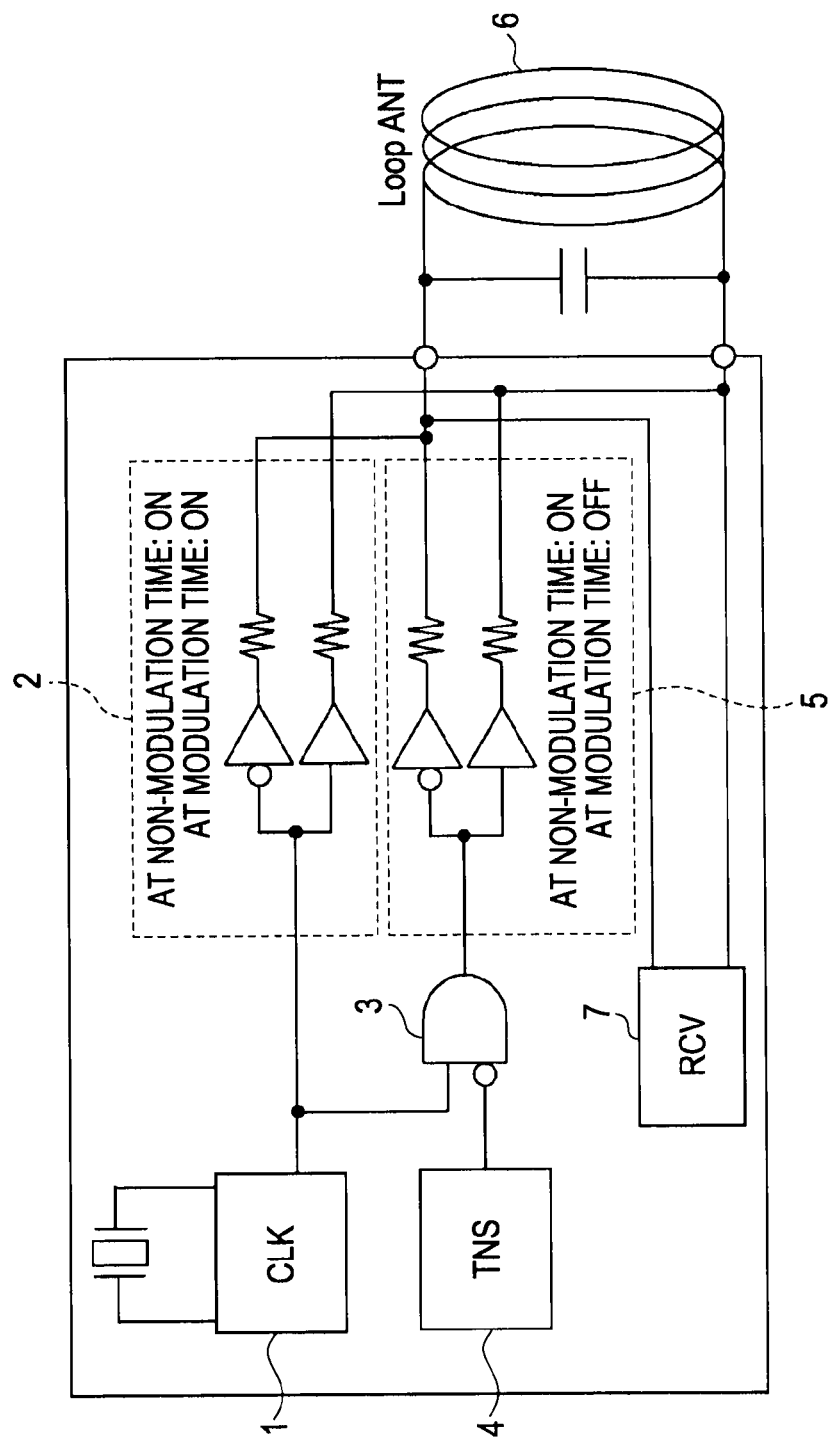
FIG. 1 is a block diagram of a reader/writer apparatus configured to have a different output impedance depending on whether at modulation time or at non-modulation time.

The present specification can be applied to a mobile telephone provided with a non-contact wireless communication apparatus performing non-contact radio communication with a reader/writer apparatus on the basis of an ASK modulation method (ASK: Amplitude Shift Keying).

[First Embodiment]
[Causes of the Occurrence of Reception Error]

First, a description will be given of causes for the occurrence of reception errors at the time of receiving data from a reader/writer apparatus by performing radio communication using a non-contact wireless communication apparatus of the mobile telephone with the reader/writer apparatus on the basis of an ASK-modulation method.

In the case of a mobile telephone according to this embodiment, when communication is performed using a non-contact wireless communication apparatus with a reader/writer apparatus, there is a slight difference in a method of generating an amplitude change between the case of data-transmission communication (the reader/writer apparatus →the non-contact wireless communication apparatus) from the reader/writer apparatus to the non-contact wireless communication apparatus and the case of data-transmission communication (the non-contact wireless communication apparatus→the reader/writer apparatus) from the non-contact wireless communication apparatus to the reader/writer apparatus.

In the case of data-transmission communication (the reader/writer apparatus→the non-contact wireless communication apparatus) from the reader/writer apparatus to the non-contact wireless communication apparatus, a level of transmission output is changed so that an excitation voltage of an antenna at the non-contact wireless communication apparatus is changed.

In contrast, in the case of data-transmission communication (the non-contact wireless communication apparatus→the reader/writer apparatus) from the non-contact wireless communication apparatus to the reader/writer apparatus, a load (resistance) of the antenna is changed by the non-contact wireless communication apparatus.

Thereby, the impedance of the antenna of the reader/writer apparatus in a magnetically coupled state is changed to generate a change in voltage. Accordingly, the communication based on an ASK modulation method is achieved as a result.

Normally, a non-contact wireless communication apparatus is not provided with a power source, such as a battery, etc., and is intended to operate only by a voltage excited by a carrier wave from a reader/writer apparatus, thereby communicating in such a way.

In this regard, such a communication mode is employed both in the case of a card-type non-contact wireless communication apparatus and a non-contact wireless communication apparatus disposed in a mobile telephone.

Here, in the above-described each communication direction, at the time of data transmission communication (the reader/writer apparatus→the non-contact wireless communication apparatus) from the reader/writer apparatus to the non-contact wireless communication apparatus, a reception error sometimes occurs because of distortion of an ASK-modulation envelope curve.

That is to say, a non-contact wireless communication apparatus operates by a clock signal extracted from the carrier wave, and thus it becomes difficult to use synchronization detection or phase detection for demodulation of data received from a reader/writer apparatus. Accordingly, in the non-contact wireless communication apparatus, the above-described data is demodulated using envelope-curve detection.

In the case of the non-contact wireless communication apparatus, a demodulation section performing envelope-curve detection is disposed in an integrated circuit. It is therefore difficult to perform waveform-shaping processing on a waveform after extraction of an envelope curve from the outside of the integrated circuit. Accordingly, if distortion arises in the envelope curve of data-communication waveform transmitted from a reader/writer apparatus, a reception error sometimes occurs by the distortion of the shape.

[Causes of the Occurrence of Envelope-Curve Distortion]

At data transmission time from a reader/writer apparatus to a non-contact wireless communication apparatus, only "amplitude change" of transmission output is performed for ASK modulation originally. However, depending on the configuration of an output section, a difference in output impedance becomes large between at modulation time and at non-modulation time, and not only the amplitude, but also unintended phase changes sometimes occur.

FIG. 1 illustrates a configuration of a reader/writer apparatus having different output impedance depending on being at modulation time or at non-modulation time.

In the case of the reader/writer apparatus shown in FIG. 1, for example, a reference clock of 13.56 MHz produced by a reference-clock generation section 1 is supplied to a first transmission buffer 2, and to an AND gate 3. Transmission data from a transmission data output section 4 is inverted and input into the AND gate 3, and output of the AND gate 3 is supplied to a second transmission buffer 5.

And at non-modulation time, the sum output of the output of the first transmission buffer 2 and the output of the second transmission buffer 5 is transmitted to the non-contact wireless communication apparatus of the mobile telephone through a loop antenna 6. At modulation time, only the output of the first transmission buffer 2 is transmitted to the non-contact wireless communication apparatus of the mobile telephone through the loop antenna 6.

Accordingly, at modulation time, the output level is lowered compared to that of non-modulation time. And in a state in which only the first transmission buffer 2 is operating (=at modulation time), the output impedance (resistance value) becomes higher than a state in which the first and second transmission buffers 2 and 5 are operating in collaboration with each other (=at non-modulation time). If the resistance value increases, the Q value (quantity indicating the intensity of resonance: $Q=(1/R)\times\sqrt{(L/C)}$) of the loop antenna 6 increases. Thus, if there is a difference between the resonance frequency and the carrier wave frequency, a change in phase also occurs at the same time.

In this regard, when the reader/writer apparatus receives data transmitted from the non-contact wireless communication apparatus of the mobile telephone through the loop antenna 6, the reader/writer apparatus demodulated the received data by the receiving section 7.

Figure 2:
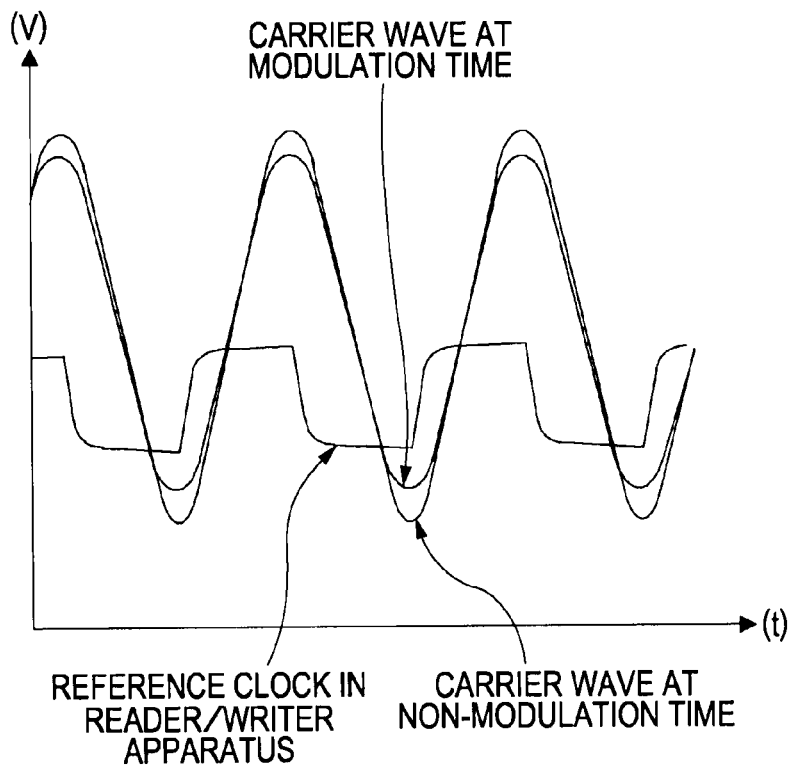
FIG. 2 is a diagram illustrating a reference-clock phase, a carrier-wave phase with respect to the reference-clock phase at non-modulation time, and a carrier-wave phase with respect to the reference-clock phase at modulation time in a state in which a reader/writer apparatus and a non-contact wireless communication apparatus are disposed apart.

FIG. 2 illustrates the reference-clock phase, a carrier-wave phase with respect to the reference-clock phase at non-modulation time, and a carrier-wave phase with respect to the reference-clock phase at modulation time in a state in which a reader/writer apparatus and a non-contact wireless communication apparatus are disposed apart.

Figure 3:
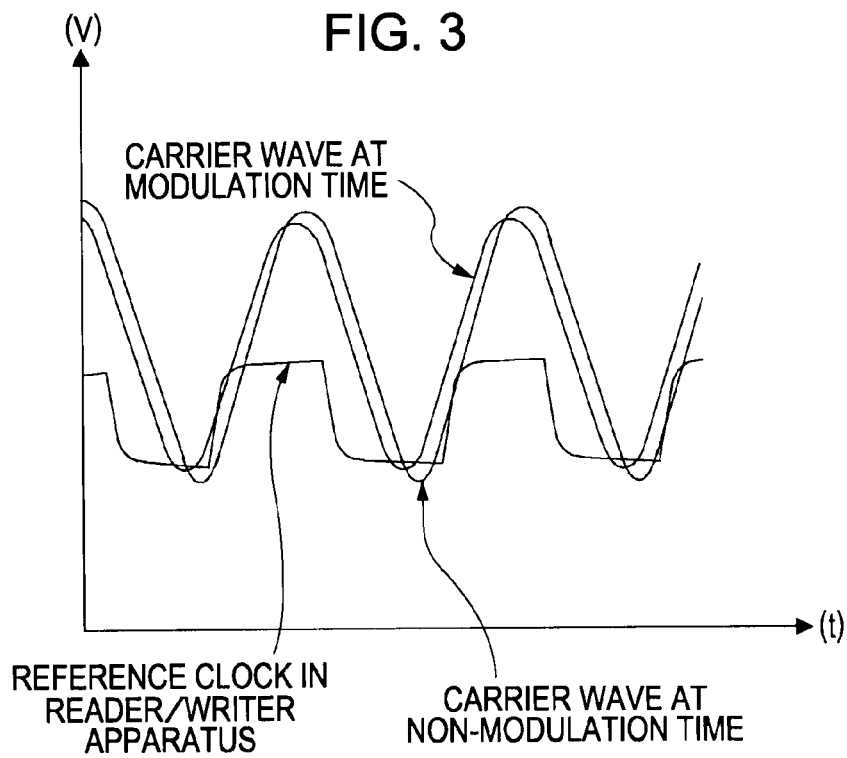
FIG. 3 is a diagram illustrating a reference-clock phase, a carrier-wave phase with respect to the reference-clock phase at non-modulation time, and a carrier-wave phase with respect to the reference-clock phase at modulation time in a state in which a non-contact wireless communication apparatus is disposed in close vicinity of a reader/writer apparatus.

Also, FIG. 3 illustrates the reference-clock phase, a carrier-wave phase with respect to the reference-clock phase at non-modulation time, and the carrier-wave phase with respect to the reference-clock phase at modulation time in a state in which the non-contact wireless communication apparatus is disposed in close vicinity of the reader/writer apparatus.

When a non-contact wireless communication apparatus comes close to the reader/writer apparatus, a battery with a metal case, etc., also comes close to the reader/writer apparatus. Thus, the L value of the loop antenna 6 decreases, and the resonance frequency increases (the resonance frequency=$1/\{2\pi\sqrt{(LC)}\}$). If the resonance frequency rises higher than the carrier-wave frequency, the resonance frequency becomes an inductive load with respect to the carrier-wave frequency. Thus, as shown in FIG. 3, individual phases of the carrier waves at non-modulation time and at modulation time become advanced in phase with respect to the reference-clock phase. Also, as described above, the output impedance (resistance value) becomes higher at modulation time than the output impedance at non-modulation time, and thus the above-described Q value increases, and such a phase change becomes still larger.

In this manner, both a change of timing for switching between the modulation time and the non-modulation time, and a change in phase occur in the carrier wave of the data transmitted from the reader/writer apparatus to the non-contact wireless communication apparatus.

Figure 4:
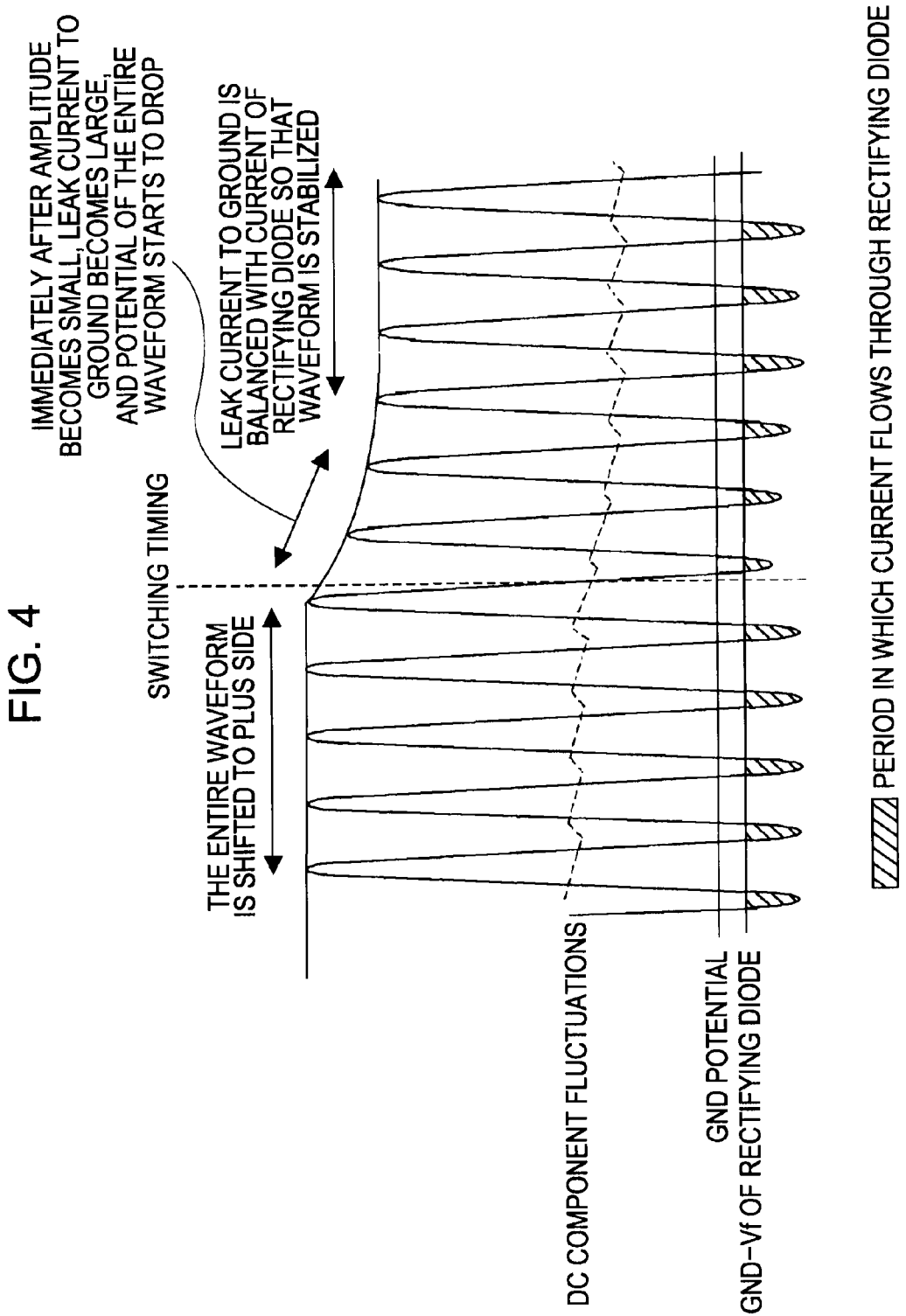
FIG. 4 is a diagram illustrating a carrier-wave waveform on an antenna of the non-contact wireless communication apparatus in the case where a phase change has not occurred at ASK-modulation time on a carrier wave of transmission data transmitted from a reader/writer apparatus to a non-contact wireless communication apparatus.

Next, FIG. 4 illustrates a carrier-wave waveform on an antenna of the non-contact wireless communication apparatus in the case where such a phase change has not occurred on the carrier wave of transmission data transmitted from the reader/writer apparatus to the non-contact wireless communication apparatus. The non-contact wireless communication apparatus is provided with a rectifying diode. A current flows through this rectifying diode in a forward voltage (Vf) period (=period near a minus-side peak of the carrier-wave waveform) of ground potential (GND)–rectifying diode, shown in FIG. 4, so that the entire waveform is raised to the plus side.

Immediately after the receive data from the reader/writer apparatus has changed from the data at non-modulation time to the data at modulation time, the amplitude of the data at modulation time becomes small so that the leak current to ground increases, and the potential of the entire waveform starts to decrease. This potential of the entire waveform become stable at the timing when the leak current to ground is balanced with the current of the rectifying diode.

Figure 5:
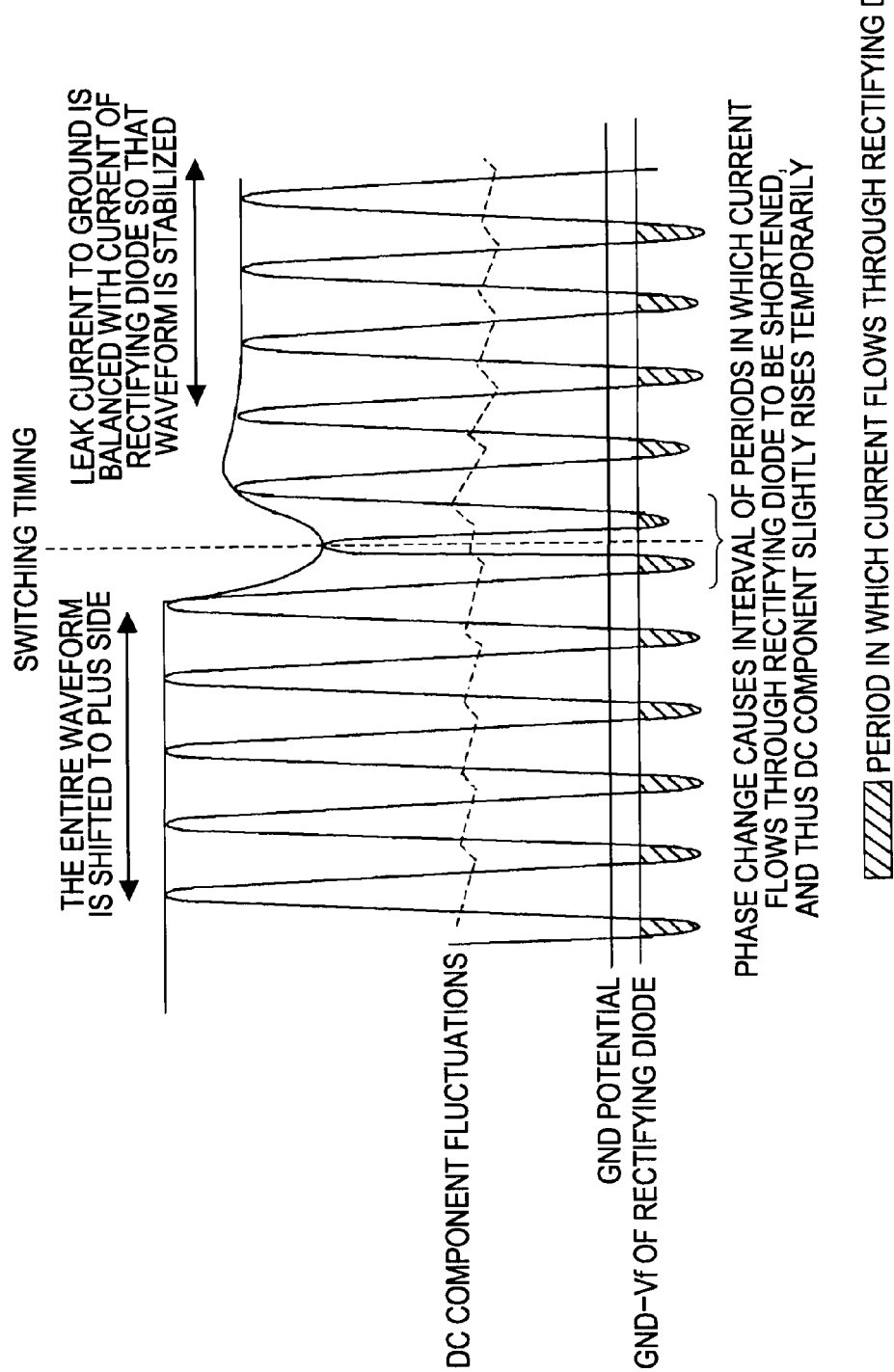
FIG. 5 is a diagram illustrating a carrier-wave waveform on an antenna of the non-contact wireless communication apparatus in the case where a phase change has occurred at ASK-modulation time on a carrier wave of transmission data transmitted from a reader/writer apparatus to a non-contact wireless communication apparatus.

On the other hand, FIG. 5 illustrates a carrier-wave waveform on an antenna of the non-contact wireless communication apparatus in the case where the above-described phase change has occurred on the carrier wave of transmission data transmitted from the reader/writer apparatus to the non-contact wireless communication apparatus.

As shown in FIG. 5, when the above-described phase change arises on the carrier wave, an interval of periods in which a current flows through rectifying diode is shortened (=timing of a current flowing through the rectifying diode also changes), an interval of periods in which a current flows through rectifying diode is shortened, and thus the direct current component (DC component) temporarily rises (or declines). And, as shown in FIG. 5, when the DC component increases, or decreases, distortion occurs on the plus-side envelope curve of the carrier-wave waveform.

[Distortion of Envelope Curve Causing Reception Error]

In this manner, when distortion arises on a plus-side envelope curve of a carrier-wave waveform, a reception error occurs on the data received by the non-contact wireless communication apparatus from the reader/writer apparatus. However, large distortion is not necessarily subject to cause an error, and there is a certain distortion shape that tends to cause a reception error.

Figure 6:
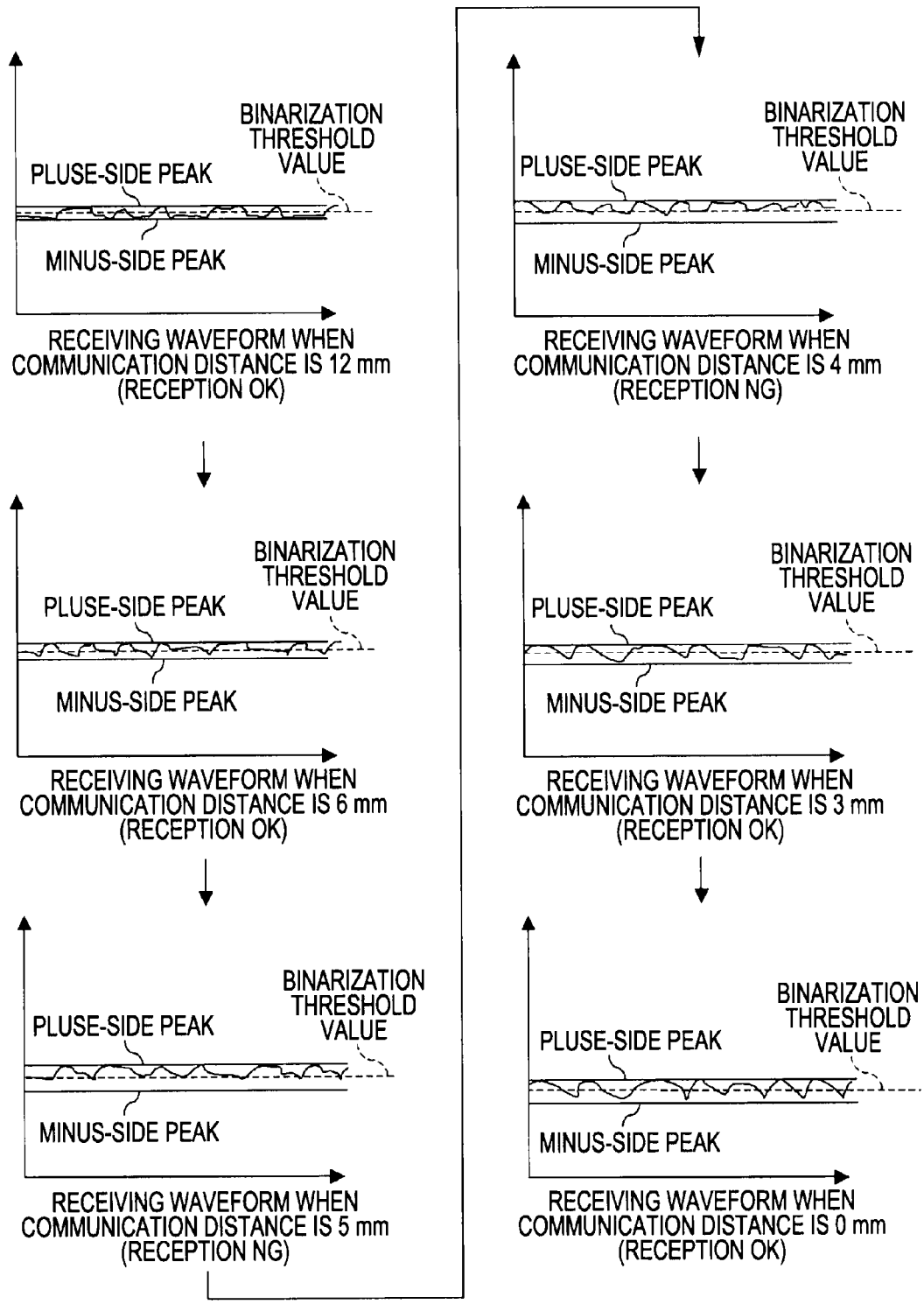
FIG. 6 is a diagram illustrating a carrier-wave waveform on an antenna of a non-contact wireless communication apparatus and whether a reception error occurs or not (reception OK or reception NG) when the non-contact wireless communication apparatus communicates with a reader/writer apparatus while the non-contact wireless communication apparatus is gradually moved closer to the reader/writer apparatus.

FIG. 6 illustrates a carrier-wave waveform on an antenna of a non-contact wireless communication apparatus and whether a reception error occurs or not (reception OK or reception NG) when the non-contact wireless communication apparatus communicates with a reader/writer apparatus while the non-contact wireless communication apparatus is gradually moved closer by 1 mm to the reader/writer apparatus from a distance of 12 mm to 0 mm (contacted). In this regard, FIG. 6 illustrates the waveforms, etc., in the cases where the distances between the reader/writer apparatus and the non-contact wireless communication apparatus are 12 mm, 6 mm, 5 mm, 4 mm, 3 mm, and 0 mm (=the reader/writer apparatus and the non-contact wireless communication apparatus are contacted), respectively.

In the demodulation section (envelope-curve detection section) of the non-contact wireless communication apparatus, the envelope-curve waveform of the carrier wave is assumed to be a rectangular wave or a triangular wave produced by blunting the rectangular wave, and a threshold value for binarizing the envelope curve is assumed to exist substantially in the middle of plus-side peak values and minus-side peak values of the envelope curve of the carrier wave.

As shown in FIG. 6, when the distance between the reader/writer apparatus and the non-contact wireless communication apparatus is between 12 mm and 6 mm, the envelope-curve waveform of the carrier wave becomes a rectangular wave or a triangular wave, and thus it becomes possible to correctly binarize the envelope curve by the threshold value set substantially in the middle of plus-side peak values and minus-side peak values of the envelope curve of the carrier wave. Accordingly, it is possible to correctly demodulate data transmitted from the reader/writer apparatus by the non-contact wireless communication apparatus without the occurrence of reception errors.

On the other hand, as shown in FIG. 6, when the distance between the reader/writer apparatus and the non-contact wireless communication apparatus becomes 5 mm or 4 mm, the waveform shape substantially in the middle of plus-side peak values and minus-side peak values of the envelope curve of the carrier wave becomes flat. Accordingly, binarization is performed on the basis of the flat waveform shape using a threshold value set substantially in the middle of plus-side peak values and minus-side peak values of the envelope curve of the carrier wave. In this manner, if the waveform becomes flat near the threshold value, the binarized rectangular wave is likely to have variations of duty ratio and glitches. Thus, data corruption occurs, causing a reception error.

In this regard, as shown in FIG. 6, when the distance between the reader/writer apparatus and the non-contact wireless communication apparatus is between 3 mm and 0 mm, the envelope-curve waveform of the carrier wave becomes a rectangular wave or a triangular wave again, and thus it becomes possible to correctly binarize the envelope curve by the threshold value set substantially in the middle of plus-side peak values and minus-side peak values of the envelope curve of the carrier wave. Accordingly, it is possible to correctly demodulate data transmitted from the reader/writer apparatus by the non-contact wireless communication apparatus without the occurrence of reception errors.

In this manner, a reception error of the data transmitted from the reader/writer apparatus occurs in the case where the waveform shape substantially in the middle of plus-side peak values and minus-side peak values of the envelope curve of the carrier wave becomes flat. Accordingly, the mobile telephone according to the first embodiment has a configuration in which the waveform shape of the envelope curve is slightly blunted so that the waveform shape of the envelope curve comes close to a triangular.

[The Entire Configuration of Mobile Telephone According to First Embodiment]

Figure 7:
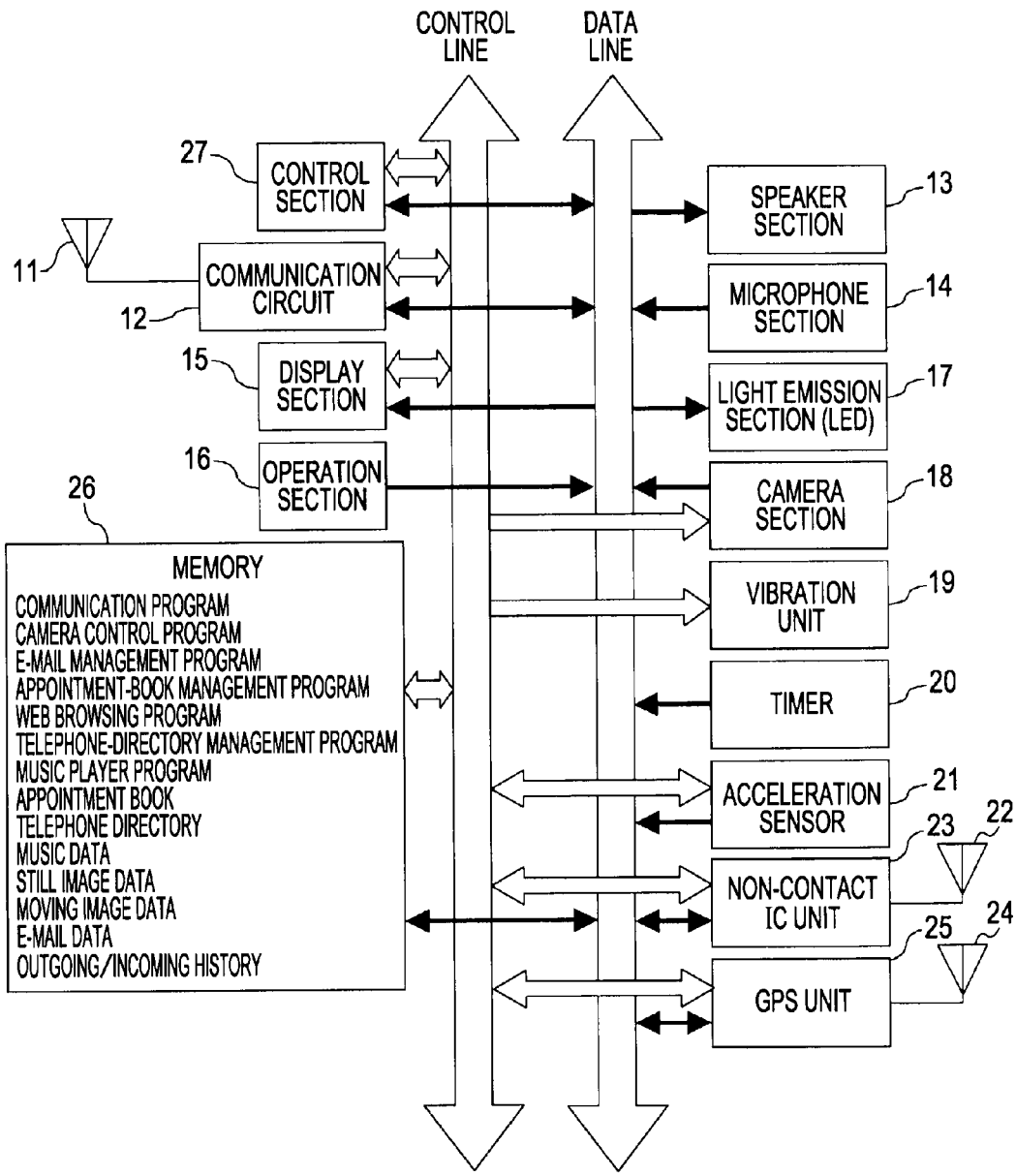
FIG. 7 is a block diagram of a mobile telephone according to a first embodiment.

FIG. 7 is a block diagram of a mobile telephone according to a first embodiment. As shown in FIG. 1, the mobile telephone has an antenna 11 and a communication circuit 12 performing radio communication with a base station, such as telephone conversation, television-telephone conversation, e-mail and Web data communication, etc.

Also, the mobile telephone has a telephone-conversation sound speaker 13 for obtaining sound output, such as received telephone sound, etc., a microphone section 14 for collecting sound, such as transmission telephone sound, etc., a display section 15 for displaying an operation menu, various kinds of application images, transmitted and received e-mails, etc., and an operation section 16 provided with operation keys, such as numeric keys, a decision key, an on-hook key, an off-hook key, etc.

Also, the mobile telephone has a light-emission section 17 (LED: Light Emitting Diode) for informing a user of transmission and reception of a telephone call, an e-mail message, etc., using light, a camera section 18 for capturing a still image or a moving image of a desired subject, a vibration unit 19 for informing the user of transmission and reception of a call, a message, etc., by vibrating the case of the mobile telephone, and a timer 20 counting the current time.

Also, the mobile telephone has an acceleration sensor 21 detecting an inclination and vibration of the mobile telephone, a loop antenna 22 and a non-contact IC unit 23 performing non-contact radio communication with a communication distance of about 30 mm, for example, with the reader/writer apparatus, and a GPS antenna 24 (GPS: Global Positioning System) and a GPS unit 25 for detecting the current position of the mobile telephone.

Also, the mobile telephone has a memory 26 which stores a communication program for performing radio communication processing through the above-described base station, various kinds of application programs, and various kinds of data handled by these individual application programs, etc., and a control section 27 controlling the entire operation of the mobile telephone.

The memory 26 includes a camera control program performing image-capture control of the camera section 18 in addition to the above-described communication program. The camera control program has a viewer function of a captured still image and moving image.

Also, the memory 26 stores an e-mail management program for controlling creation, transmission and receiving of an e-mail, and an appointment-book management program for managing an appointment book storing a user's schedule.

Also, the memory 26 stores a Web browsing program for browsing a Web page, etc., by accessing a server disposed on a predetermined network, such as a communication network, the Internet, etc., and transmitting and receiving information, a telephone-directory management program for managing a telephone directory, and a music player program for playing back music data.

Also, the memory 26 has an appointment book (=schedule-data storage areas) for storing a user's desired schedule, and a telephone directory (=individual user's personal information storage area) storing user names of acquaintances and friends, etc., still images (photographs of faces, etc.), addresses, telephone numbers, e-mail addresses, birth month and date, etc.

Also, the memory 26 stores music data to be played back on the basis of the music player program, still-image data and moving-image data to be played back on the basis of the viewer function of the camera control program, transmitted and received e-mail data, transmission/reception history of telephone calls and e-mails, etc.

[Entire Configuration of Non-Contact Wireless Communication Apparatus]

Figure 8:
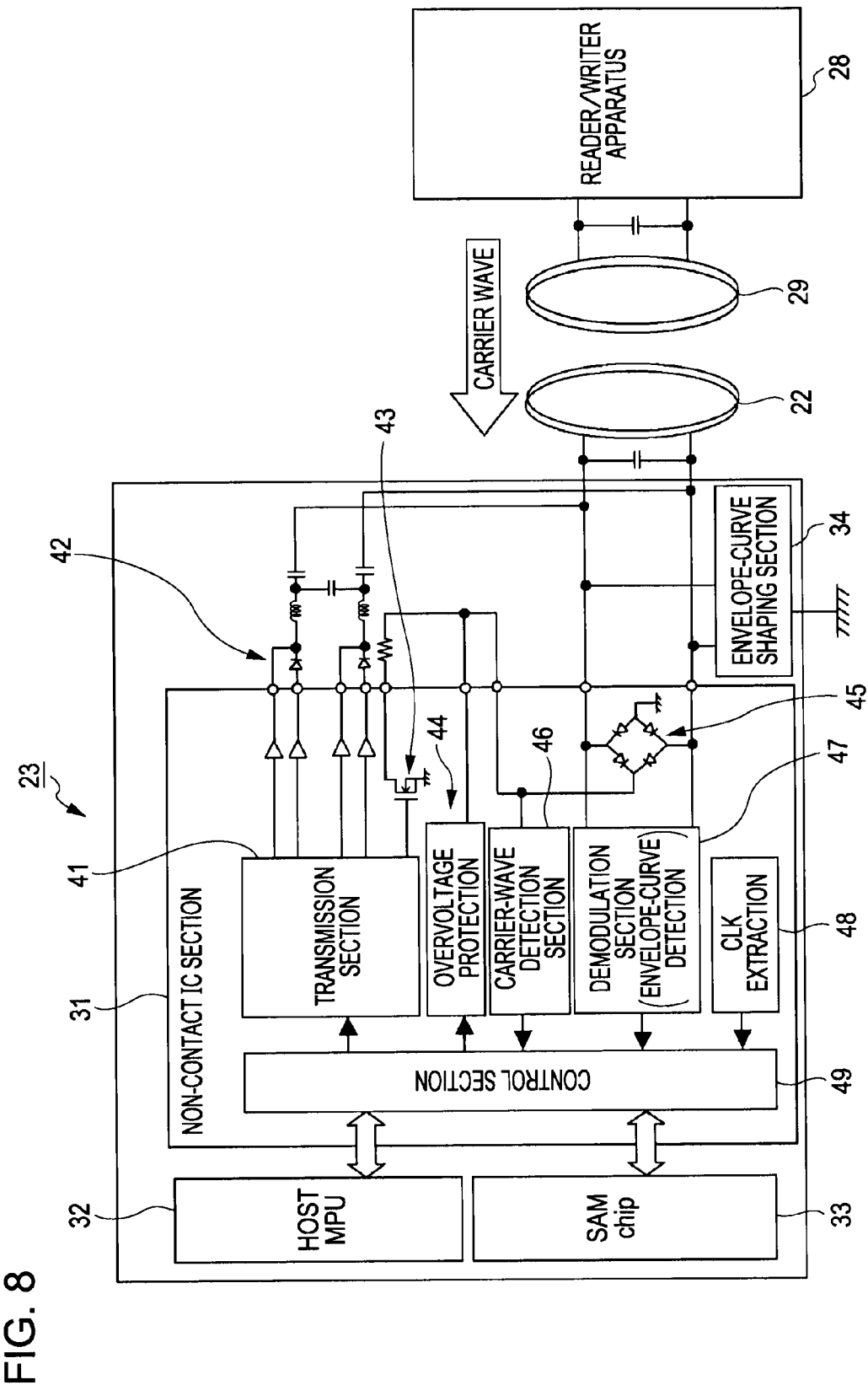
FIG. 8 is a block diagram illustrating the entire configuration of a non-contact wireless communication apparatus disposed in the mobile telephone according to the first embodiment.

FIG. 8 illustrates the entire configuration of a non-contact IC unit 23. As shown in FIG. 8, the non-contact IC unit 23 has a non-contact IC section 31, a host MPU 32 (MPU: Micro Processing Unit), and a secure application module 33 (SAM chip) in addition to the above-described loop antenna 22 for performing non-contact radio communication with a reader/writer apparatus 28 including a loop antenna 29.

Also, the non-contact IC unit 23 has an envelope-curve shaping section 34 connected between the non-contact IC section 31 and the loop antenna 22. To put it another way, the non-contact IC unit 23 has an envelope-curve shaping section 34 disposed at the outside of the non-contact IC section 31.

The non-contact IC section 31 has a transmission section 41, a carrier wave transmission section 42, and a load switch 43 for forming data to be transmitted to the reader/writer apparatus, and an over-voltage protection section 44 for protecting the non-contact IC section 31 from over voltage.

Also, the non-contact IC section 31 has a rectification section 45 formed by four rectifying diodes for rectifying data received from the reader/writer apparatus 28, and a carrier-wave detection section 46 detecting a carrier wave from data rectified by the rectification section 45.

Also, the non-contact IC section 31 has a demodulation section 47 (envelope-curve detection section) performing envelope-curve detection from the data rectified by the rectification section 45 to demodulate the data, a reference-clock extraction section 48 extracting a reference clock from the data and the carrier wave demodulated by the demodulation section 47, and a control section 49 controlling the entire operation of the non-contact IC section 31.

[Configuration of Envelope-Curve Shaping Section]

Figure 9:
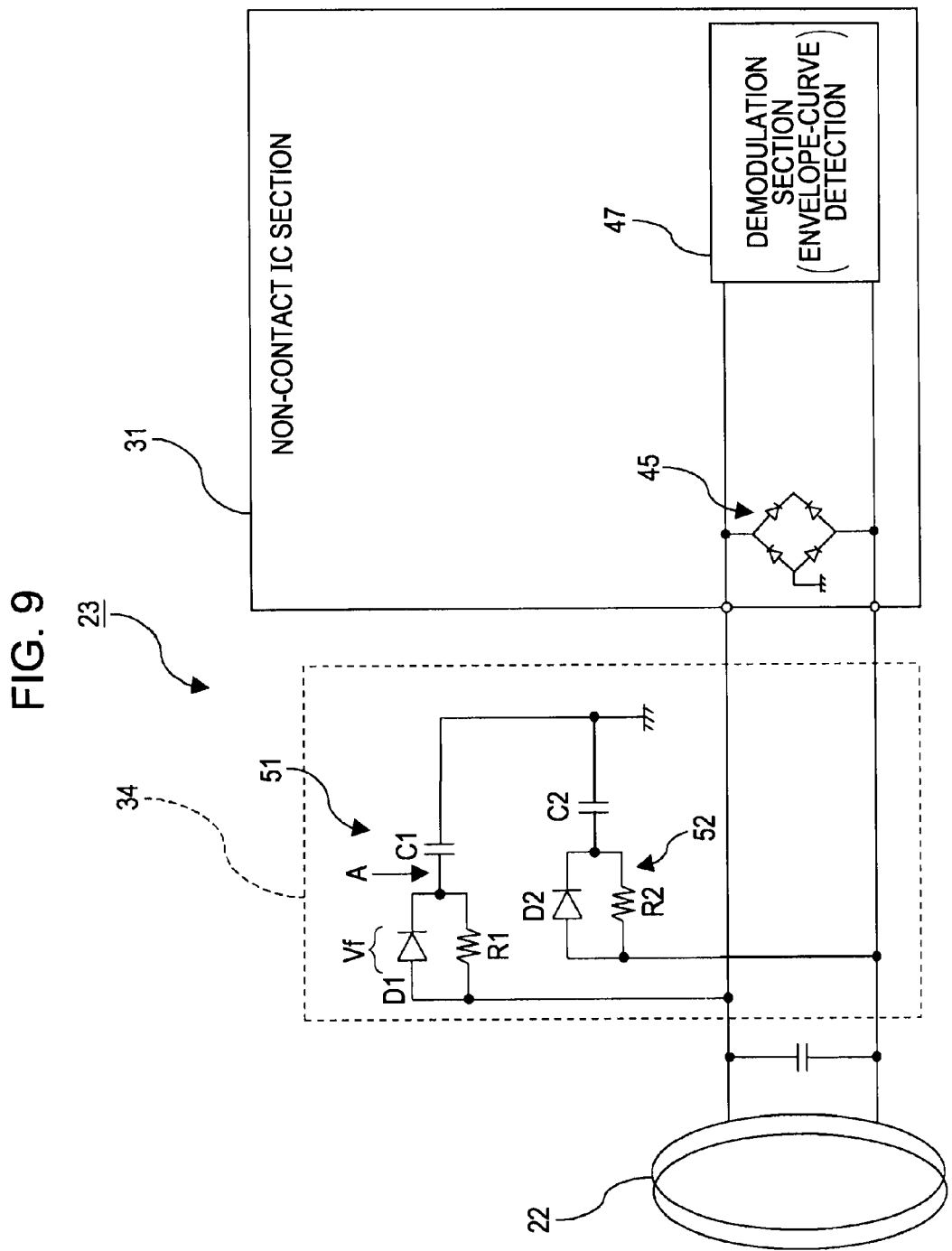
FIG. 9 is a circuit diagram of an envelope-curve shaping section disposed in the non-contact wireless communication apparatus.

As shown in FIG. 9, the envelope-curve shaping section 34 disposed at the outside of the above-described non-contact IC section 31 has a first envelope-curve shaping section 51 and a second envelope-curve shaping section 52 connected between an antenna line and ground (GND).

The first envelope-curve shaping section 51 has a diode D1, a capacitor C1, and a resistor R1. The anode of the diode D1 is connected to an antenna line. Also, the cathode of the diode D1 is connected to one end of the capacitor C1, and the other node of which is connected to ground. Also, one end of the resistor R1 is connected to a connection point of the anode of the diode D1 and the antenna line, and the other end of the resistor R1 is connected to a connection point of the cathode of the diode D1 and one end of the capacitor C1.

In the same manner as the first envelope-curve shaping section 51, the second envelope-curve shaping section 52 has a diode D2, a capacitor C2, and a resistor R2. The anode of the diode D2 is connected to the antenna line. Also, the cathode of the diode D2 is connected to one end of the capacitor C2, the other end of which is connected to ground. Also, one end of the resistor R2 is connected to a connection point of the anode of the diode D2 and the antenna line, and the other end of the resistor R2 is connected to a connection point between the cathode of the diode D2 and one end of the capacitor C2.

In this regard, in this example, the first envelope-curve shaping section 51 and the second envelope-curve shaping section 52 are configured to be symmetrical in order to keep the loop antenna 22 balanced. However, if the non-contact IC section 31 is not a balanced type, an envelope-curve shaping section ought to be disposed only at a side having a higher excitation voltage.

[Envelope-Curve Shaping Operation]

Next, a description will be given of envelope-curve shaping operation of the individual envelope-curve shaping sections 51 and 52 having such a configuration. In this regard, the operations of the first envelope-curve shaping section 51 and the second envelope-curve shaping section 52 are the same, and thus, in the following, a description will be given only of the operation of the first envelope-curve shaping section 51. For the operation of the second envelope-curve shaping section 52, refer to the following first envelope-curve shaping section 51.

In the first envelope-curve shaping section 51, when the carrier wave from the reader/writer apparatus 28 is exited on the loop antenna 22, electric charge is stored in the capacitor C1 through the diode D1. Thereby, a potential of a connection point, shown by arrow A in FIG. 9, between the diode D1 and the capacitor C1 is maintained at a potential which is lowered by a forward voltage Vf of the diode D1 from the peak voltage of the carrier wave.

In this state, when ASK-modulated data is received from the reader/writer apparatus, and the potential of the loop antenna 22 is lowered, the electric charge stored in the capacitor C1 is supplied to the loop antenna 22 through the resistor R1. Thereby, it is possible to shape the falling waveform of the envelope curve of the carrier wave to a gradual falling waveform (=the envelope curve of the carrier wave can be shaped into a waveform close to a triangular wave).

Figure 10:
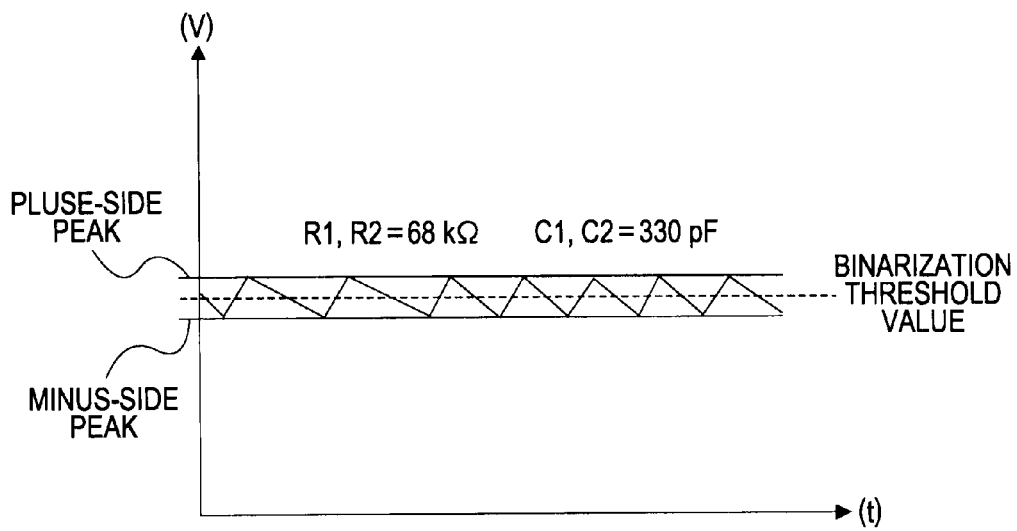
FIG. 10 is a diagram illustrating an envelope-curve waveform in the case where a first envelope-curve shaping section of an envelope-curve shaping section disposed in a non-contact wireless communication apparatus includes a resistor having a resistance value of 68 k$\Omega$ and a capacitor having a capacitance of 330 pF, and a second envelope-curve shaping section includes a resistor having a resistance value of 68 k$\Omega$ and a capacitor having a capacitance of 330 pF, and a communication distance between the non-contact wireless communication apparatus and the reader/writer apparatus is 4 mm.

FIG. 10 is a diagram illustrating an envelope-curve waveform in the case where the first envelope-curve shaping section 51 includes the resistor R1 having a resistance value of 68 kΩ and the capacitor C1 having a capacitance of 330 pF, and the second envelope-curve shaping section 52 includes the resistor R2 having a resistance value of 68 kΩ and the capacitor C2 having a capacitance of 330 pF, and a communication distance between the non-contact IC unit 23 and the reader/writer apparatus 28 is 4 mm.

Figure 11:
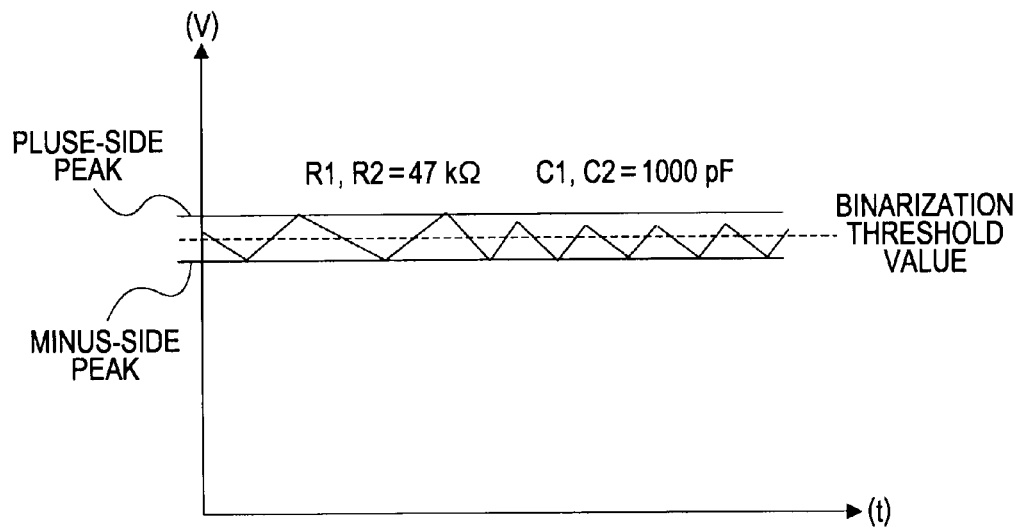
FIG. 11 is a diagram illustrating an envelope-curve waveform in the case where a first envelope-curve shaping section of an envelope-curve shaping section disposed in a non-contact wireless communication apparatus includes a resistor having a resistance value of 47 k$\Omega$ and a capacitor having a capacitance of 1000 pF, and a second envelope-curve shaping section includes a resistor having a resistance value of 47 k$\Omega$ and a capacitor having a capacitance of 1000 pF, and a communication distance between the non-contact wireless communication apparatus and the reader/writer apparatus is 4 mm.

Also, FIG. 11 is a diagram illustrating an envelope-curve waveform in the case where the first envelope-curve shaping section 51 includes the resistor R1 having a resistance value of 47 kΩ and the capacitor C1 having a capacitance of 1000 pF, and the second envelope-curve shaping section 52 includes the resistor R2 having a resistance value of 47 kΩ and the capacitor C2 having a capacitance of 1000 pF, and a communication distance between the non-contact IC unit 23 and the reader/writer apparatus 28 is 4 mm.

As described using FIG. 6, when the distance between the non-contact IC unit 23 and the reader/writer apparatus 28 becomes 5 mm or 4 mm, the waveform shape substantially in the middle of plus-side peak values and minus-side peak values of the envelope curve of the carrier wave becomes flat. Accordingly, it becomes disadvantageously difficult to perform binarization on the basis of the flat waveform shape using a threshold value set substantially in the middle of plus-side peak values and minus-side peak values of the envelope curve of the carrier wave.

However, the above-described envelope-curve shaping section 34 is disposed between the non-contact IC section 31 and the loop antenna 22 so that the envelope curve of the carrier wave can be changed to have a waveform close to a triangular wave as shown in FIGS. 10 and 11. Accordingly, it is possible to prevent the disadvantage of causing the waveform shape substantially in the middle of plus-side peak values and minus-side peak values of the envelope curve of the carrier wave to become flat, and thus it is possible for the demodulation section 47 in the later stage to perform correct binarization processing of the envelope curve. Accordingly, a reception error can be prevented.

In this regard, as is understood by comparing FIG. 10 and FIG. 11, if the capacitance value of the capacitor C1 is increased and the resistance value of the resistor R1 is decreased, the amount of change in the waveform (=the amount of operation) can be increased.

However, if the capacitance value of the capacitor C1 is increased and the resistance value of the resistor R1 is decreased, the Q value of the loop antenna 22 based on the path from the resistor R1 to the capacitor C1 to the ground (GND) drops greatly, and the communication distance becomes short. Accordingly, it is preferable to set the capacitance value of the capacitor C1 and the resistance value of the resistor R1 to minimum values at which a reception error ceases to occur, and to keep the amount of waveform operation at a minimum.

[Advantages of First Embodiment]

As is apparent from the above-described description, the mobile telephone according to the first embodiment is provided with the envelope-curve shaping section 34 including a diode, a capacitor, and a resistor between the antenna line of the non-contact IC unit 23 and ground (GND), and receives ASK-modulated data from the reader/writer apparatus. Accordingly, when the potential of the loop antenna 22 is lowered, the electric charge stored in the capacitor is supplied to the loop antenna 22 through the resistor so that the falling waveform of the envelope curve of the carrier wave is shaped to a gradual falling waveform (=shapes the envelope curve of the carrier wave into a triangular wave).

Thereby, it is possible to prevent the disadvantage of causing the waveform shape substantially in the middle of plus-side peak values and minus-side peak values of the envelope curve of the carrier wave to become flat. Thus, it is possible for the demodulation section 47 in the later stage to perform correct binarization processing of the envelope curve. Accordingly, a reception error can be prevented.

Also, the envelope-curve shaping section 34 is disposed at the outside of the non-contact IC section 31, and thus it is possible to adjust individual values of the diode, the resistor, and the capacitor while viewing the actual waveform. Accordingly, it is possible to adjust individual values of the diode, the resistor, and the capacitor so as to change a minimum necessary amount without changing the envelope-curve waveform by an unnecessary large amount.

Also, the mobile telephone according to the first embodiment has the following advantages over a mobile telephone provided with a magnetic sheet.

That is to say, if a mobile telephone including a non-contact wireless communication apparatus and a lot of metal parts comes close to a reader/writer apparatus, magnetic flux is canceled by a eddy current occurred on the metal surfaces of the mobile telephone, and thus the L value of the loop antenna of the reader/writer apparatus fluctuates.

Thus, among the current mobile telephones, there are widespread mobile telephones in which a magnetic sheet formed by a material having a high magnetic permeability is attached on the metal frame which ensures a strength of a battery and a display section such that the magnetic sheet is positioned between the metal surface of the mobile telephone and the reader/writer apparatus when the mobile telephone comes close to the reader/writer apparatus.

In the case of a mobile telephone in which the magnetic sheet is attached, it is possible for the magnetic sheet to reduce magnetic flux passing through the metal surface, and thus to prevent the occurrence of the eddy current. However, the magnetic sheet itself is expensive, and also, attaching the magnetic sheet is troublesome work.

Also, the case of the mobile telephone disadvantageously increases in thickness by the thickness of the magnetic sheet itself. This is contrary to a tendency of making the case slim in recent years.

Further, the magnetic sheet influences antenna characteristics of an antenna performing radio communication with a base station, an antenna receiving television broadcasting, the other antennas, such as a GPS antenna, etc., and thus there are many restrictions on use of the sheet.

In contrast of such a magnetic sheet, in the case of a mobile telephone according to the present embodiment, the envelope-curve shaping section 34 can be formed using standard parts, such as the diodes D1 and D2, the resistors R1 and R2, and the capacitors C1 and C2 through a simple implementation process. Accordingly, it is possible to form the mobile telephone at a lower cost compared with the case of using the magnetic sheet. Also, it is possible to perform implementation by simple work. As one example, in the case of disposing a magnetic sheet, it costs about 30 yen including a man-hour cost of attaching the sheet. However, in the case of a mobile telephone according to the present embodiment, the above-described envelope-curve shaping section 34 can be disposed at about 7 yen including the implementation cost.

Also, the envelope-curve shaping section 34 is formed by very small electronic parts, such as the diodes D1 and D2, the resistors R1 and R2, and the capacitors C1 and C2, and thus the envelope-curve shaping section 34 can be implemented in a very small area. Accordingly, the envelope-curve shaping section 34 does not influence the thickness of the mobile telephone, and can contribute the slimming of the mobile telephone.

Also, the envelope-curve shaping section 34 does not influence the antenna characteristics of an antenna performing radio communication with a base station, an antenna receiving television broadcasting, the other antennas, such as a GPS antenna, etc. Thus, it is possible to implement the envelope-curve shaping section 34 substantially freely without considering the individual antenna characteristics. Accordingly, the design of the mobile telephone can be simplified.

Also, the mobile telephone according to the first embodiment has the following advantages compared with a non-contact radio communication system performing command retry.

That is to say, in the case of a non-contact radio communication system performing command retry, if a communication error occurs between the non-contact wireless communication apparatus and the reader/writer apparatus, the processing waits for a predetermined time period (time-out processing). At the timing of the passage of the predetermined time period, the reader/writer apparatus transmits the command once again to the non-contact wireless communication apparatus so that a communication error is prevented.

The re-transmission of the command is performed in the expectation that the communication distance between the non-contact wireless communication apparatus and the reader/writer apparatus will be changed after the communication error.

However, as described using FIG. 6, when the distance between the non-contact wireless communication apparatus and the reader/writer apparatus is kept to be 5 mm or 4 mm, which causes a communication error without change, even if the command is transmitted once again, a communication error disadvantageously occurs once again. Also, re-transmission of the command is performed after the time-out processing, and thus the processing takes a longer time by the amount of time for waiting the time-out.

In contrast, in the case of the mobile telephone according to the present embodiment, even at a distance of 5 mm or 4 mm, which causes a communication error so far, a communication error does not occur between the non-contact wireless communication apparatus and the reader/writer apparatus, and correct communication can be performed. Thus, it is possible to prevent a disadvantage of taking a long time for the time-out processing. Accordingly, it is possible for the user to use the mobile telephone with ease.

[Variation of First Embodiment]

In the description of the above-described first embodiment, the envelope-curve shaping section 34 is disposed at the outside of the non-contact IC section 31. However, the envelope-curve shaping section 34 may be disposed at the inside of the non-contact IC section 31, and the envelope-curve shaping section 34 and the non-contact IC section 31 may be contained in a single chip.

Also, a plurality of envelope-curve shaping sections may be disposed at the outside of the non-contact IC section 31 or at the inside of the non-contact IC section 31. For example, a first envelope-curve shaping section in which the individual values of the diode, the resistor, and the capacitor are adjusted to predetermined values, a second envelope-curve shaping section in which the individual values of the diode, the resistor, and the capacitor are adjusted to values different from those of the first envelope-curve shaping section, and a third envelope-curve shaping section in which the individual values of the diode, the resistor, and the capacitor are adjusted to values different from those of the first and second envelope-curve shaping sections . . . , etc., may be disposed, and these envelope-curve shaping sections may be selectively used.

In this manner, by providing a plurality of envelope-curve shaping sections, it is possible to select and use an envelope-curve shaping section allowing to shape a most suitable envelope curve for each mobile telephone model. Also, it is possible to perform envelope-curve shaping processing for a plurality of mobile telephone models using one non-contact wireless communication apparatus provided with the plurality of envelope-curve shaping sections.

[Second Embodiment]

Next, a description will be given of a mobile telephone according to a second embodiment.

In general, a passive-type non-contact wireless communication apparatus performs information transmission by returning part of power received from a reader/writer apparatus to the reader/writer apparatus (=part of radio wave from a reader/writer apparatus is reflected by a loop antenna, and data is put on the reflected wave to be returned to a reader/writer apparatus).

Accordingly, there is no problem in the case of receiving data from a reader/writer apparatus. However, in the case of transmitting data from a non-contact wireless communication apparatus to a reader/writer apparatus, the data is transmitted using part of power received from the reader/writer apparatus (=data is transmitted using a little power), and thus the communication distance tends to be shorter at the time of transmission than at the time of reception.

In such a non-contact wireless communication apparatus, in the same manner as the above-described mobile telephone according to the first embodiment, if the capacitance value of the capacitor C1 is made large and the resistance value of the resistor R1 is made small, the Q value of the loop antenna 22 based on the path from the resistor R1 to the capacitor C1 and then to the ground GND drops, and the communication distance at the transmission time becomes significantly short.

In the mobile telephone according to the second embodiment, only when data from the reader/writer apparatus 28 is received by the non-contact IC unit 23, the envelope-curve shaping section 34 is connected to the loop antenna 22. And when data is transmitted from the non-contact IC unit 23 to the reader/writer apparatus 28, the envelope-curve shaping section 34 is not connected to the loop antenna 22, and thus the above-described problem of shortening the communication distance has been overcome.

[Configuration of Substantial Part of Second Embodiment]

Figure 12:
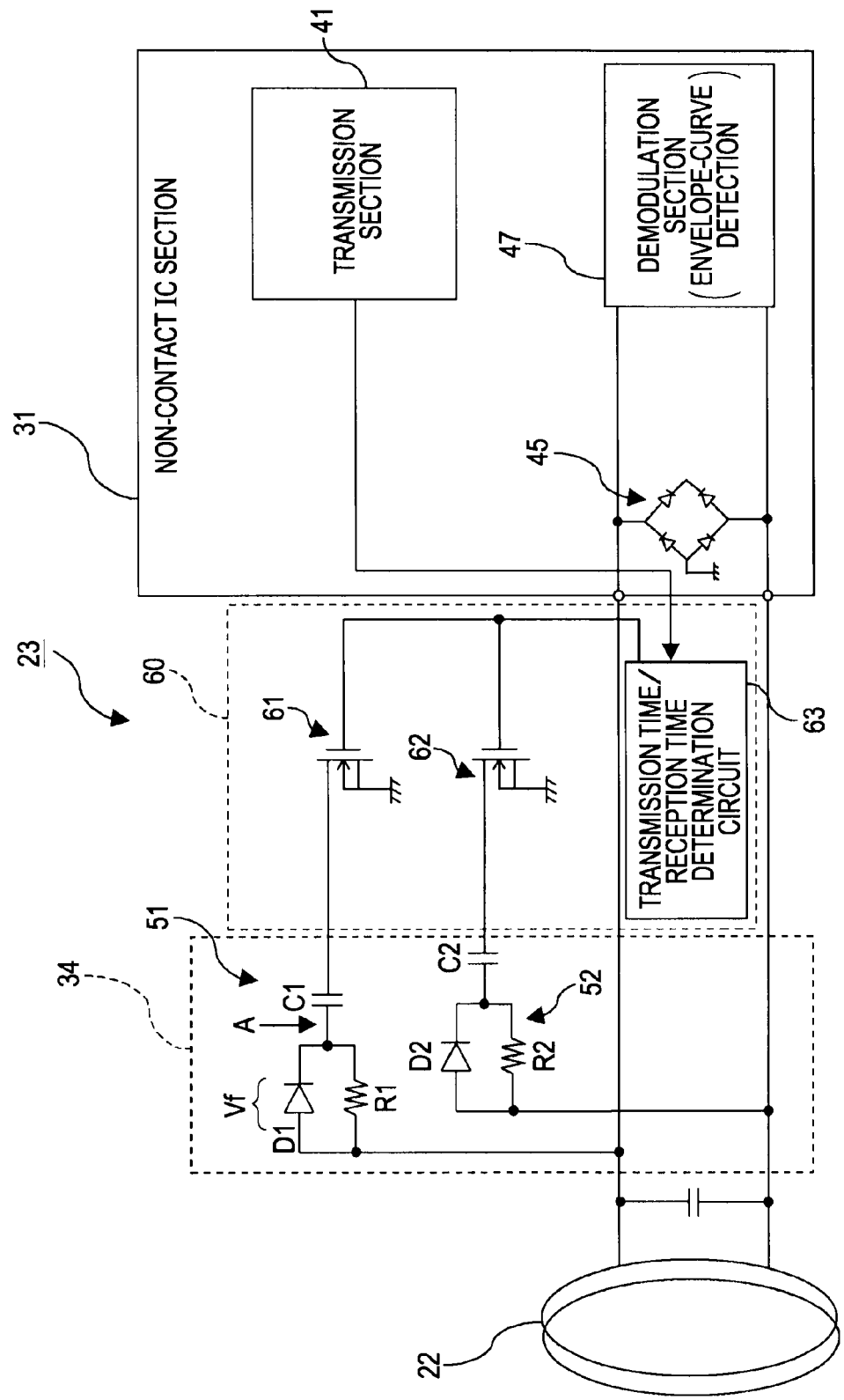
FIG. 12 is a block diagram of a substantial part of a mobile telephone, provided with a connection control section connecting or not connecting a envelope-curve shaping section to a loop antenna, according to a second embodiment.

FIG. 12 is a block diagram illustrating a substantial part of a mobile telephone according to the second embodiment. As shown in FIG. 12, a non-contact IC unit 23 of the mobile telephone according to the second embodiment is provided with a connection control section 60 which connects or disconnects the envelope-curve shaping section 34 with the loop antenna 22 together with the above-described envelope-curve shaping section 34.

The connection control section 60 has a first connection control switch 61 (SW1) and a second connection control switch 62 (SW2), each of which is formed by a field effect transistor (FET), and a transmission time/reception time-determination circuit 63 which determines whether it is transmission time during which the non-contact IC unit 23 transmits data to the reader/writer apparatus 28 or reception time during which data from the reader/writer apparatus 28 is received by the non-contact IC unit 23.

The source of the first connection control switch 61 is connected to the other end of the capacitor C1, the drain thereof is connected to ground, and the gate thereof is connected to the transmission time/reception time-determination circuit 63. In the same manner, the source of the second connection control switch 62 is connected to the other end of the capacitor C2, the drain thereof is connected to ground, and the gate thereof is connected to the transmission time/reception time-determination circuit 63.

A transmission section 41 of the non-contact IC section 31 is provided with a monitoring terminal (a monitoring terminal for obtaining a monitoring output indicating being in process of transmission is disposed) for a development engineer, etc., to monitor a waveform of data being transmitted to the reader/writer apparatus 28. In the case of the mobile telephone according to the second embodiment, the monitoring terminal of the transmission section 41 is connected to the transmission time/reception time-determination circuit 63.

[Operation of Connection Control Section]

In the case of the mobile telephone according to the second embodiment, the transmission time/reception time-determination circuit 63 of the connection control section 60 determines whether the non-contact IC unit 23 is at the time of transmission or at the time of reception on the basis of the output from the monitoring terminal of the transmission section 41. And while the transmission time/reception time-determination circuit 63 is supplying a determination output indicating that the non-contact IC unit 23 is transmitting data from the transmission time/reception time-determination circuit 63, the transmission time/reception time-determination circuit 63 applies low-level voltages (off control signals) to the gate of the first connection control switch 61 and the gate of the second connection control switch 62, respectively.

Also, while the transmission time/reception time-determination circuit 63 is supplying a determination output indicating that the non-contact IC unit 23 is receiving data, the transmission time/reception time-determination circuit 63 applies high-level voltages (on control signals) to the gate of the first connection control switch 61 and the gate of the second connection control switch 62, respectively. Thereby, it is possible to disconnect the loop antenna 22 from the first envelope-curve shaping section 51 and the second envelope-curve shaping section 52 while the non-contact IC unit 23 is transmitting data, and to connect the loop antenna 22 with the first envelope-curve shaping section 51 and the second envelope-curve shaping section 52 only while the non-contact IC unit 23 is receiving data in order to perform the above-described envelope-curve-waveform shaping processing.

[Advantages of Second Embodiment]

As is apparent from the above description, in the mobile telephone according to the second embodiment, when data is transmitted from the non-contact IC unit 23 to the reader/writer apparatus 28, the connection control section 60 disconnects the envelope-curve shaping section 34 from the loop antenna 22, and only when data from the reader/writer apparatus 28 is received by the non-contact wireless communication apparatus 12, the connection control section 60 connects the envelope-curve shaping section 34 with the loop antenna 22 in order to perform the above-described envelope-curve-waveform shaping processing.

Thereby, it is possible to make the capacitance value of the capacitor C1 large, to prevent the disadvantage of shortening the communication distance at the time when the non-contact IC unit 23 transmits data to the reader/writer apparatus 28, and to obtain the same advantages as those of the mobile telephone according to the above-described first embodiment.

In this regard, when performing on/off control on the first connection control switch 61 and the second connection control switch 62, the resonance frequency of the loop antenna 22 fluctuates. In order to make the fluctuations of the resonance frequency small, it is preferable to dispose diodes having a small capacitance across the terminals as the diode D1 and the diode D2.

[Variation of Second Embodiment]

In the description of the above-described second embodiment, the envelope-curve shaping section 34 and the connection control section 60 are disposed at the outside of the non-contact IC section 31. However, the envelope-curve shaping section 34 and the connection control section 60 may be disposed at the inside of the non-contact IC section 31, and the envelope-curve shaping section 34, the connection control section 60, and the non-contact IC section 31 may be contained in a single chip.

Also, a plurality of envelope-curve shaping sections and connection control sections may be disposed at the outside of the non-contact IC section 31 or at the inside of the non-contact IC section 31. For example, a first envelope-curve shaping section in which the individual values of the diode, the resistor, and the capacitor are adjusted to predetermined values and a connection control section of the first envelope-curve shaping section, a second envelope-curve shaping section in which the individual values of the diode, the resistor, and the capacitor are adjusted to values different from those of the first envelope-curve shaping section and a connection control section of the second envelope-curve shaping section, and a third envelope-curve shaping section in which the individual values of the diode, the resistor, and the capacitor are adjusted to values different from those of the first and second envelope-curve shaping sections and a connection control section of the third envelope-curve shaping section . . . , etc., may be disposed, and these envelope-curve shaping sections may be selectively used.

In this manner, by providing a plurality of envelope-curve shaping sections and connection control sections, it is possible to select and use an envelope-curve shaping section and a connection control section allowing to shape a most suitable envelope curve for each mobile telephone model. Also, it is possible to perform envelope-curve shaping processing for a plurality of mobile telephone models using one non-contact wireless communication apparatus provided with the plurality of envelope-curve shaping sections and connection control sections.

[Third Embodiment]

Next, a description will be given of a mobile telephone according to a third embodiment. In the mobile telephone according to the above-described second embodiment, the first and the second connection control switches 61 and 62 (SW1 and SW2) are on/off-controlled on the basis of the output from the monitoring terminal of the transmission section 41. However, in the mobile telephone according to the third embodiment, the first and the second connection control switches 61 and 62 (SW1 and SW2) are on/off-controlled on the basis of the output from a load switch 43 disposed on a passive-type non-contact wireless communication apparatus.

[Configuration of Substantial Part of Third Embodiment]

Figure 13:
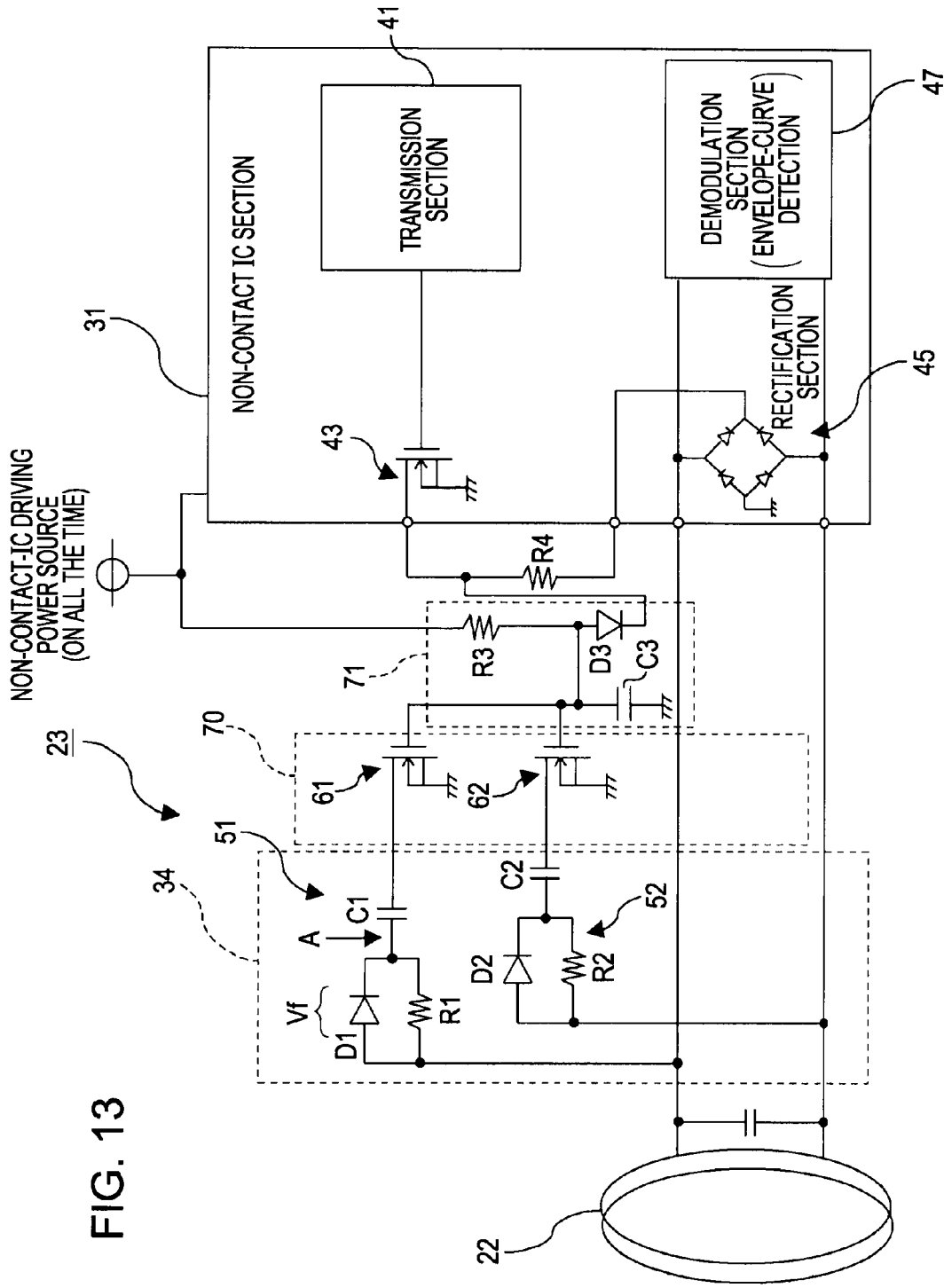
FIG. 13 is a block diagram of a substantial part of a mobile telephone, provided with a connection control section connecting or not connecting a envelope-curve shaping section to a loop antenna on the basis of an output of a load switch disposed in the non-contact wireless communication apparatus, according to a third embodiment.

FIG. 13 is a block diagram of a substantial part of a mobile telephone according to a third embodiment.

As shown in FIG. 13, a non-contact IC unit 23 of the mobile telephone according to the third embodiment is provided with a connection control section 70 which connects or disconnects the envelope-curve shaping section 34 with the loop antenna 22 on the basis of an output of the load switch 43 together with the above-described envelope-curve shaping section 34.

The connection control section 70 has a first connection control switch 61 (SW1) and a second connection control switch 62 (SW2), each of which is formed by a field effect transistor (FET), and a waveform process section 71 which processes the output of the load switch 43 into on/off-control signals of the individual connection control switches 61 and 62.

The waveform process section 71 is connected to a driving power source of the non-contact IC section 31. To put it another way, the driving power source of the non-contact IC section 31 is also used as a pull-up power source of the waveform process section 71. It is necessary for the waveform process section 71 to supply a voltage having a sufficient margin at least for the gate threshold values of the first connection control switch 61 and the second connection control switch 62, and also to operate all the time while the non-contact IC section 31 is activated. Accordingly, in the mobile telephone according to the present embodiment, the driving power source of the non-contact IC section 31 is used for the pull-up power source of the waveform process section 71.

The waveform process section 71 has a pull-up resistor R3, a diode D3, and a capacitor C3. One end of the pull-up resistor R3 is connected to the driving power source of the non-contact IC section 31, and the other end of the pull-up resistor R3 is connected to the anode of the diode D3. Also, the cathode of the diode D3 is connected to a connection point between the load switch 43 of the non-contact IC section 31 and a load-switch adjustment resistor R4.

The gate of the first connection control switch 61 and the gate of the second connection control switch 62 are connected to one end of the capacitor C3 of which the other end is connected to ground, respectively, and are connected to a connection point of the pull-up resistor R3 and the diode D3.

[Operation of Connection Control Section]

First, in the mobile telephone according to the third embodiment, at the time of receiving data from the reader/writer apparatus 28, the load switch 43 of the non-contact IC section 31 becomes an off state while receiving the data. Accordingly, individual gate potentials of the first connection control switch 61 and the second connection control switch 62 increase near to the pull-up power voltage by the pull-up resistor R3, and the first connection control switch 61 and the second connection control switch 62 become both on states. Thereby, the envelope-curve shaping section 34 is connected to the loop antenna 22 of the non-contact IC unit 23. And the envelope curve of the carrier wave is shaped into a triangular wave by the above-described envelope-curve shaping processing of the envelope-curve shaping section 34, and thereby a reception error is prevented.

On the other hand, at the time of transmitting data to the reader/writer apparatus 28, the load switch 43 of the non-contact IC section 31 is frequently on/off-controlled in accordance with the transmission data. When the load switch 43 becomes an on state, a current flows to the load switch 43 through the diode D3, and the electric charge stored in the capacitor C3 is discharged. Thereby, the individual gate potentials of the first connection control switch 61 and the second connection control switch 62 drop near to the forward voltage Vf of the diode D3. Usually, the gate-threshold-value voltages of the first and the second connection control switches 61 and 62 formed by a field effect transistor (FET) is sufficiently higher than the forward voltage Vf of the diode D3, and thus the first and the second connection control switches 61 and 62 change to an off-state at this time.

Here, as described above, it is necessary to disconnect the envelope-curve shaping section 34 from the loop antenna 22 of the non-contact IC unit 23 while data is transmitted to the reader/writer apparatus 28. Accordingly, in the case of the mobile telephone according to this embodiment, the resistance value of the pull-up resistor R3 and the capacitance value of the capacitor C3 are set such that the voltage does not exceed the gate threshold values of the first and the second connection control switches 61 and 62 while the load switch 43 is in an off-state at the time of transmitting data to the reader/writer apparatus 28, and are set such that the voltage sufficiently exceeds the gate threshold values of the first and the second connection control switches 61 and 62 at the time of receiving data from the reader/writer apparatus 28 next.

Figure 14:
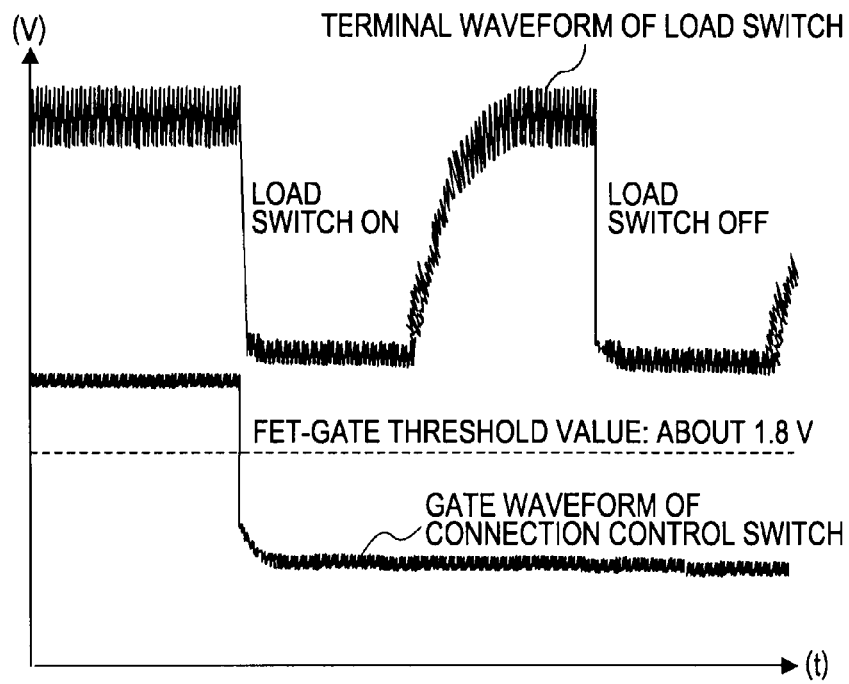
FIG. 14 is a diagram illustrating a terminal waveform of a load switch when the load switch performs on operation and off operation in sequence at data transmission time to a reader/writer apparatus, and a gate-voltage waveform of a first and a second connection control switches in this case.

FIG. 14 illustrates a terminal waveform of the load switch 43 when the load switch 43 performs on operation and off operation in sequence at data transmission time to the reader/writer apparatus 28, and gate-voltage waveforms of the first and the second connection control switches 61 and 62 in this case.

Figure 15:
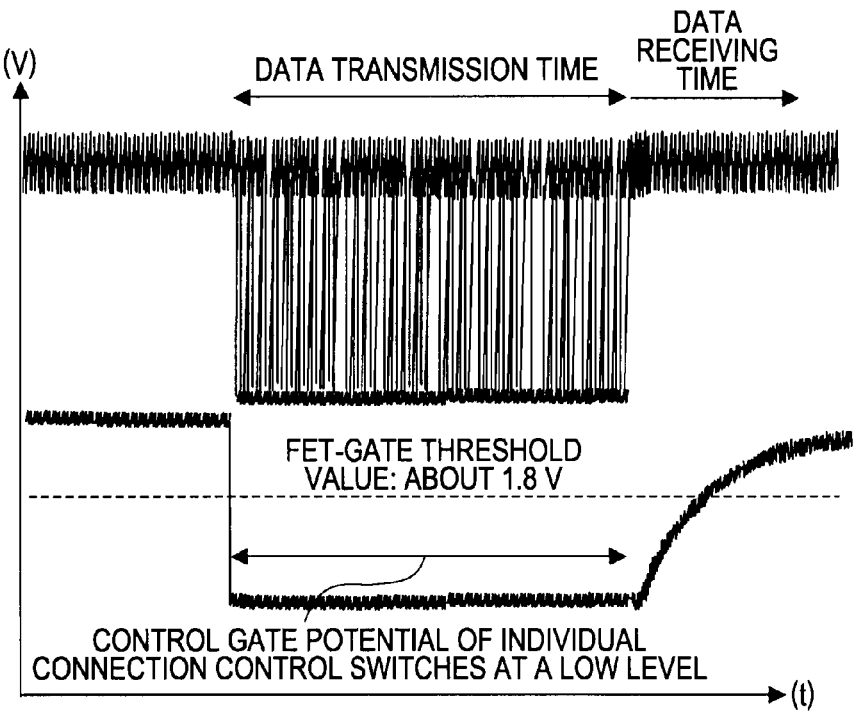
FIG. 15 is a diagram illustrating a terminal waveform of a load switch when the load switch frequently repeats on/off operations at data transmission time to a reader/writer apparatus, and a gate-voltage waveform of a first and a second connection control switches at the time of switching from data transmission to a reader/writer apparatus to data receiving from the reader/writer apparatus.

Also, FIG. 15 illustrates a terminal waveform of the load switch 43 when the load switch 43 frequently repeats on/off operations at data transmission time to the reader/writer apparatus 28, and gate-voltage waveforms of the first and the second connection control switches 61 and 62 at the time of switching from data transmission to the reader/writer apparatus 28 to data receiving from the reader/writer apparatus 28.

As shown in FIG. 14 and FIG. 15, in the mobile telephone according to the third embodiment, it is possible to off-control both the first connection control switch 61 and the second connection control switch 62 during the transmission of the data by on-operation of the load switch 43 at the time of transmitting data to the reader/writer apparatus 28. Accordingly, it is possible to disconnect the envelope-curve shaping section 34 from the loop antenna 22 of the non-contact IC unit 23 during the data transmission, and thus to prevent the above-described disadvantage of shortening the communication distance at data transmission time.

Also, when the non-contact IC unit 23 changes from transmitting data to the reader/writer apparatus 28 to receiving data from the reader/writer apparatus 28, the load switch 43 becomes an off-state so that the storage of electric charge in the capacitor C3 is started, and as shown in FIG. 15, it is possible to gradually increase the individual gate potentials of the first and the second connection control switches 61 and 62 in accordance with a time constant calculated by the multiplication of the resistance value of the pull-up R3 and the capacitance value of the capacitor C3.

Accordingly, it is possible to on-control the first and the second connection control switches 61 and 62 at the time of receiving data from the reader/writer apparatus 28, and thus to connect the envelope-curve shaping section 34 to the loop antenna 22 of the non-contact IC unit 23 in order to perform the above-described envelope-curve-waveform shaping processing.

[Advantages of Third Embodiment]

As is apparent from the above description, in the mobile telephone according to a third embodiment, the waveform process section 71, which processes the output of the load switch 43 into the on/off-control signals of the above-described individual connection control switches 61 and 62, is formed by the pull-up resistor R3, the diode D3, and the capacitor C3. And at the time of transmitting data to the reader/writer apparatus 28, the resistance value of the pull-up resistor R3 and the capacitance value of the capacitor C3 are set such that the voltage does not exceed the gate threshold values of the first and the second connection control switches 61 and 62 while the load switch 43 is in an off-state at the time of transmitting data to the reader/writer apparatus 28, and are set such that the voltage sufficiently exceeds the gate threshold values of the first and the second connection control switches 61 and 62 at the time of receiving data from the reader/writer apparatus 28 next.

Thereby, the same advantages as those of the individual embodiments described above can be obtained, and it is possible to off-control both the first connection control switch 61 and the second connection control switch 62 during the transmission of the data by on-operation of the load switch 43 at the time of transmitting data to the reader/writer apparatus 28. Accordingly, it is possible to disconnect the envelope-curve shaping section 34 from the loop antenna 22 of the non-contact IC unit 23 during the data transmission, and thus to prevent the above-described disadvantage of shortening the communication distance at data transmission time.

Also, when the non-contact IC unit 23 changes from transmitting data to the reader/writer apparatus 28 to receiving data from the reader/writer apparatus 28, the load switch 43 becomes an off-state so that the storage of electric charge in the capacitor C3 is started, and it is possible to gradually increase the individual gate potentials of the first and the second connection control switches 61 and 62 in accordance with a time constant calculated by the multiplication of the resistance value of the pull-up R3 and the capacitance value of the capacitor C3. Also, it is possible to on-control the first and the second connection control switches 61 and 62, and thus to connect the envelope-curve shaping section 34 to the loop antenna 22 of the non-contact IC unit 23 in order to perform the above-described envelope-curve-waveform shaping processing.

In this regard, in the mobile telephone according to the third embodiment, it is preferable to use a pull-up R3 having a high resistance value as much as possible and a capacitor C3 having a small capacitance as much as possible in consideration of power consumption. However, if the capacitance value of the capacitor C3 is set to too small, superposition of a carrier wave component might cause an error. Accordingly, for example, it is preferable to set the resistance value of the pull-up resistor R3 to about 470 kΩ and the in the capacitance value of the diode C3 to about 330 pF in the case of using a carrier wave of 13.56 MHz.

Also, the diode D3 functions to prevent a current to flow from the load switch 43 into the capacitor C3, and to hide the capacitance of the capacitor C3 to the load switch 43. Accordingly, it is preferable for the diode D3 to have a small capacitance value across terminals as much as possible, and to dispose a diode having a small reverse current.

[Variation of Third Embodiment]

In the description of the above-described third embodiment, the envelope-curve shaping section 34 and the connection control section 70 are disposed at the outside of the non-contact IC section 31. However, the envelope-curve shaping section 34 and the connection control section 70 may be disposed at the inside of the non-contact IC section 31, and the envelope-curve shaping section 34, the connection control section 70, and the non-contact IC section 31 may be contained in a single chip.

Also, a plurality of envelope-curve shaping sections and connection control sections may be disposed at the outside of the non-contact IC section 31 or at the inside of the non-contact IC section 31. For example, a first envelope-curve shaping section in which the individual values of the diode, the resistor, and the capacitor are adjusted to predetermined values and a connection control section of the first envelope-curve shaping section, a second envelope-curve shaping section in which the individual values of the diode, the resistor, and the capacitor are adjusted to values different from those of the first envelope-curve shaping section and a connection control section of the second envelope-curve shaping section, and a third envelope-curve shaping section in which the individual values of the diode, the resistor, and the capacitor are adjusted to values different from those of the first and second envelope-curve shaping sections and a connection control section of the third envelope-curve shaping section . . . , etc., may be disposed, and these envelope-curve shaping sections may be selectively used.

In this manner, by providing a plurality of envelope-curve shaping sections and connection control sections, it is possible to select and use an envelope-curve shaping section and a connection control section allowing to shape a most suitable envelope curve for each mobile telephone model. Also, it is possible to perform envelope-curve shaping processing for a plurality of mobile telephone models using one non-contact wireless communication apparatus provided with the plurality of envelope-curve shaping sections and connection control sections.

[Other Embodiments]

In the descriptions of the above-described individual embodiments and individual variations, the non-contact IC unit 23 is disposed in a mobile telephone. However, the non-contact IC unit 23 may be a card-type non-contact wireless communication apparatus. In this case, the same advantages as described above can also be obtained. Also, the non-contact IC unit 23 may be disposed in the other electronic devices, for example, such as a PHS telephone (PHS: Personal Handyphone System), a PDA apparatus (PDA: Personal Digital Assistant), a mobile game machine, a digital camera, a moving-image capturing apparatus, a notebook-sized personal computer, etc., in addition to a mobile telephone. In any one of the cases, the same advantages as described above can also be obtained.

Also, the non-contact IC unit 23 is assumed to perform radio communication in a very short distance, for example, radio communication with a very short distance of about 30 mm. However, the non-contact IC unit 23 may be used as a short-distance radio communication unit performing short-distance radio communication having a communication distance of, for example, a few meters to tens of meters. In the case of disposing a short-distance radio communication unit, a falling waveform of the envelope curve of the carrier wave is shaped into a gradual falling waveform to obtain a waveform close to a triangular wave so that the same advantages as described above can be obtained.

Also, the present embodiment may be applied to a radio communication apparatus performing radio communication on the basis of an NFC standard (NFC: Near Field Communication) in addition to a radio communication apparatus performing radio communication on the basis of an RFID function (RFID: Radio Frequency IDentification). In any one of the cases, the same advantages as described above can also be obtained.

Finally, the above-described individual embodiments and individual variations are examples of the claimed invention. Accordingly, the claimed invention is not limited to the above-described individual embodiments and individual variations. Additionally, various changes can be made in the claimed invention depending on design, etc., without departing from the spirit and scope of the claimed invention as a matter of course.

What is claimed is:

1. A non-contact wireless communication apparatus comprising:
an antenna section configured to receive a carrier wave;
an envelope-curve shaping section configured to shape a falling waveform of an envelope curve of the carrier wave into a gradual falling waveform; and
a demodulation section configured to extract the envelope curve shaped by the envelope-curve shaping section and perform envelope-curve detection by binarizing the envelope curve with a predetermined threshold value,
wherein the envelope-curve shaping section is made up of a diode, a capacitor, and a resistor, and
an anode of the diode is connected to an antenna line of the antenna section, a cathode of the diode is connected to a first end of the capacitor, a second end of the capacitor is connected to ground, a first end of the resistor is connected to the antenna line of the antenna section, and a second end of the resistor is connected to a connection point between the cathode of the diode and the first end of the capacitor, such that the diode and the resistor are connected in parallel between the antenna line and the capacitor.

2. The non-contact wireless communication apparatus according to claim 1, wherein the envelope-curve shaping section is configured to store a charge at a non-modulation time of the carrier wave and output the charge stored at non-modulation time of the carrier wave with a predetermined time constant at a modulation time of the carrier wave to shape a falling waveform of the envelope curve of the carrier wave into a gradual falling waveform.

3. The non-contact wireless communication apparatus according to claim 1, wherein the envelope-curve shaping section is controlled to shape the envelope curve of the carrier wave only at a data receiving time.

4. The non-contact wireless communication apparatus according to claim 1, wherein the envelope-curve shaping section is disposed between the demodulation section and the antenna section.

5. The non-contact wireless communication apparatus according to claim 1, wherein there are a plurality of envelope-curve shaping sections.

6. The non-contact wireless communication apparatus according to claim 1, wherein the carrier wave received at the antenna section has been ASK (amplitude shift keying) modulated and radio-transmitted.

7. The non-contact wireless communication apparatus according to claim 1, wherein the demodulation section and the envelope-curve shaping section are contained on a single chip.

8. The non-contact wireless communication apparatus according to claim 1, further comprising:
- a determination circuit that determines when the non-contact wireless communication apparatus is transmitting data and when the non-contact wireless communication apparatus is receiving data; and
- a connection control section configured to connect the envelope-curve shaping section to the antenna section only when the non-contact wireless communication apparatus is receiving data, the connection control section including at least one switch, the source of the switch being connected to the second end of the capacitor, the drain of the switch being connected to ground, and the gate of the switch being connected to the determination circuit.

9. The non-contact wireless communication apparatus according to claim 1, wherein the non-contact wireless communication apparatus is a card-type non-contact wireless communication apparatus.

10. A method of waveform-shaping an envelope curve, implemented on a non-contact wireless communication apparatus, comprising:
- receiving, at an antenna section, a carrier wave;
- shaping a falling waveform of an envelope curve of the carrier wave into a gradual falling waveform; and
- extracting the shaped envelope curve performing envelope-curve detection by binarizing the envelope curve with a predetermined threshold value,
- wherein step of shaping the falling waveform is performed by an envelope-curve shaping section of the non-contact wireless communication apparatus, the envelope-curve shaping section being made up of a diode, a capacitor, and a resistor, and
- an anode of the diode is connected to an antenna line of the antenna section, a cathode of the diode is connected to a first end of the capacitor, a second end of the capacitor is connected to ground, a first end of the resistor is connected to the antenna line of the antenna section, and a second end of the resistor is connected to a connection point between the cathode of the diode and the first end of the capacitor, such that the diode and the resistor are connected in parallel between the antenna line and the capacitor.

11. A mobile terminal apparatus comprising:
- a communication circuit configured to perform radio communication with a base station; and
- a non-contact wireless communication device that includes
- an antenna section configured to receive a carrier wave;
- an envelope-curve shaping section configured to shape a falling waveform of an envelope curve of the carrier wave into a gradual falling waveform; and
- a demodulation section configured to extract the envelope curve shaped by the envelope-curve shaping section and perform envelope-curve detection by binarizing the envelope curve with a predetermined threshold value,
- wherein the envelope-curve shaping section is made up of a diode, a capacitor, and a resistor, and
- an anode of the diode is connected to an antenna line of the antenna section, a cathode of the diode is connected to a first end of the capacitor, a second end of the capacitor is connected to ground, a first end of the resistor is connected to the antenna line of the antenna section, and a second end of the resistor is connected to a connection point between the cathode of the diode and the first end of the capacitor, such that the diode and the resistor are connected in parallel between the antenna line and the capacitor.

12. The non-contact wireless communication apparatus according to claim 8, wherein the determination circuit includes a resistor, a diode, and a capacitor, and the gate of the switch is connected at least one end of each of the resister, the diode, and the capacitor of the determination circuit, and the resistance value of the resistor of the determination circuit and the capacitance value of the capacitor of the determination circuit is predetermined such that the voltage at the gate of the switch does not exceed a gate threshold value when the non-contact wireless communication apparatus is transmitting data.

* * * * *